US008527115B2

(12) United States Patent
Greenfeld et al.

(10) Patent No.: US 8,527,115 B2
(45) Date of Patent: *Sep. 3, 2013

(54) AIRBORNE RECONNAISSANCE SYSTEM

(75) Inventors: Israel Greenfeld, Kfar Vradim (IL); Zvi Yavin, Gilon-Misgav (IL); Bernd Uhl, Aalen (DE)

(73) Assignee: Rafael Armament Development Authority Ltd., Haifa (IL)

(*) Notice: Subject to any disclaimer, the term of this patent is extended or adjusted under 35 U.S.C. 154(b) by 1162 days.

This patent is subject to a terminal disclaimer.

(21) Appl. No.: 11/926,862

(22) Filed: Oct. 29, 2007

(65) Prior Publication Data

US 2008/0211912 A1    Sep. 4, 2008

Related U.S. Application Data

(63) Continuation of application No. 11/538,882, filed on Oct. 5, 2006, now Pat. No. 7,308,342, and a continuation of application No. 10/484,677, filed on Jan. 23, 2004, now Pat. No. 7,136,726.

(51) Int. Cl.
  *G01C 11/02*    (2006.01)
  *G01S 3/786*    (2006.01)

(52) U.S. Cl.
  USPC ............................ 701/3; 701/302; 382/108

(58) Field of Classification Search
  USPC ....... 701/3, 6, 20, 8, 208, 220, 302; 382/108;
    348/143, 144, 135, 139; 340/995.27, 995.24;
    342/36, 354; 244/165
  See application file for complete search history.

(56) References Cited

U.S. PATENT DOCUMENTS

| 4,829,304 A | 5/1989 | Baird |
| 4,908,705 A | 3/1990 | Wight |
| 4,954,837 A | 9/1990 | Baird et al. |

(Continued)

FOREIGN PATENT DOCUMENTS

| EP | 0171751 A2 | 2/1986 |
| FR | 2798999 | 3/2001 |

(Continued)

OTHER PUBLICATIONS

Kumar et al, "Aerial Video Surveillance and Exploitation", Proceedings of the IEEE, vol. 89, No. 10, Oct. 2001, pp. 1518-1539.

(Continued)

*Primary Examiner* — Tan Q Nguyen
(74) *Attorney, Agent, or Firm* — Marsteller & Associates, P.C.

(57) ABSTRACT

An airborne reconnaissance system comprising: (1) Gimbals having at least two degrees of freedom; (2) At least one array of light sensors positioned on the gimbals, for being directed by the same within at least two degrees of freedom; (3) Map storage means for storing at least one Digital Elevation Map of an area of interest, divided into portions; (4) Inertial Navigation System for real-time providing to a gimbals control unit navigation and orientation data of the aircraft with respect to a predefined global axes system; (5) Portion selection unit for selecting, one at a time, another area portion from the area of interest; and (6) servo means for directing the gimbals. The system uses data from the inertial navigation system and from the digital elevation map for real-time calculating direction to selected area portions, and for maintaining the direction during integration of light from the terrain, and for producing corresponding images of area portions.

13 Claims, 16 Drawing Sheets

(56) References Cited

U.S. PATENT DOCUMENTS

| | | | |
|---|---|---|---|
| 5,055,683 A | 10/1991 | McCracken | |
| 5,072,396 A * | 12/1991 | Fitzpatrick et al. | 701/409 |
| 5,077,609 A | 12/1991 | Manelphe | |
| 5,155,597 A | 10/1992 | Lareau et al. | |
| 5,166,789 A * | 11/1992 | Myrick | 348/144 |
| 5,247,356 A | 9/1993 | Ciampa | |
| 5,368,254 A | 11/1994 | Wickholm | |
| 5,418,364 A | 5/1995 | Hale et al. | |
| 5,467,271 A * | 11/1995 | Abel et al. | 702/5 |
| 5,504,686 A | 4/1996 | Lippitt et al. | |
| 5,663,825 A | 9/1997 | Amon et al. | |
| 5,668,593 A * | 9/1997 | Lareau et al. | 348/146 |
| 5,672,866 A | 9/1997 | Messina | |
| 5,672,872 A | 9/1997 | Wu | |
| 5,692,062 A | 11/1997 | Lareau et al. | |
| 5,726,747 A | 3/1998 | Houlberg et al. | |
| 5,787,333 A | 7/1998 | Rasinski et al. | |
| 5,798,786 A | 8/1998 | Lareau et al. | |
| 5,878,356 A | 3/1999 | Garrot, Jr. et al. | |
| 5,892,462 A | 4/1999 | Tran | |
| 5,894,323 A * | 4/1999 | Kain et al. | 348/116 |
| 5,948,044 A | 9/1999 | Varley et al. | |
| 5,967,458 A | 10/1999 | Williams et al. | |
| 5,969,676 A | 10/1999 | Tran et al. | |
| 6,000,661 A | 12/1999 | Price | |
| 6,020,955 A | 2/2000 | Messina | |
| 6,061,068 A | 5/2000 | Hoffman, II et al. | |
| 6,108,032 A | 8/2000 | Hoagland | |
| 6,129,307 A | 10/2000 | Deoms et al. | |
| 6,130,705 A | 10/2000 | Lareau et al. | |
| 6,181,988 B1 * | 1/2001 | Schneider et al. | 701/3 |
| 6,201,232 B1 | 3/2001 | Carlisle | |
| 6,222,464 B1 * | 4/2001 | Tinkel et al. | 340/945 |
| 6,256,057 B1 | 7/2001 | Mathews et al. | |
| 6,281,970 B1 | 8/2001 | Williams et al. | |
| 6,293,488 B1 | 9/2001 | Wells et al. | |
| 6,359,681 B1 | 3/2002 | Housand et al. | |
| 6,366,734 B1 | 4/2002 | Beran et al. | |
| 6,396,961 B1 | 5/2002 | Wixson et al. | |
| 6,422,508 B1 | 7/2002 | Barnes | |
| 6,477,326 B1 | 11/2002 | Partynski et al. | |
| 6,549,828 B1 | 4/2003 | Garrot, Jr. et al. | |
| 6,597,818 B2 | 7/2003 | Kumar et al. | |
| 6,694,228 B2 | 2/2004 | Rios | |
| 6,747,686 B1 * | 6/2004 | Bennett | 348/145 |
| 7,127,348 B2 * | 10/2006 | Smitherman et al. | 701/409 |
| 7,184,072 B1 * | 2/2007 | Loewen et al. | 348/144 |
| 7,400,950 B2 * | 7/2008 | Reich | 701/3 |
| 2001/0038718 A1 | 11/2001 | Kumar et al. | |
| 2003/0142002 A1 * | 7/2003 | Winner et al. | 342/36 |
| 2003/0164962 A1 | 9/2003 | Nims et al. | |
| 2003/0212478 A1 * | 11/2003 | Rios | 701/2 |
| 2004/0105090 A1 * | 6/2004 | Schultz et al. | 356/141.5 |
| 2004/0141170 A1 | 7/2004 | Jamieson et al. | |

FOREIGN PATENT DOCUMENTS

| | | |
|---|---|---|
| GB | 2312300 | 12/1999 |
| GB | 2345155 A | 6/2000 |
| WO | W09742659 | 11/1997 |
| WO | WO 98/03882 A1 | 1/1998 |
| WO | 01/29513 A1 | 4/2001 |
| WO | WO 01/69171 A3 | 9/2001 |
| WO | WO0177627 | 10/2001 |

OTHER PUBLICATIONS

Voisinet, "Control Processing System Architecture for the Optical Communications Demonstrator", SPIE Proceedings, vol. 2123, 1994, pp. 393-398.
Riek K et al., The Raytheon DB-110 Sensor: Four Cameras in One, Package, Raytheon Systembs Company 1999.
I. W. Scaysbrook, "Terprom digital Terrain System", Proceedings, Helsinki Symposium 2001: 18-21.
Silent Stalker, Air Force Today, htt;://www.combatsim.com/archive/htm arc4/stalker.htm, 2000.
Shukai L. et al., A new Airborne Remote Sensing Platform for Generating Geocoding Image Without Ground Control Point, IEEE (1997).
Schlapfer D et al., Parametric Geocoding of Aviris . . . Derived Flight path, Remote Sensing Labo., Dept. of, Geography, Univ. of Zurich, Switzerland (1998)—Summary Only.
Ruck, "Design versatility of the prism panoramic camera: the KS-116 and KA-95 cameras", SPIE vol. 309 Airborne Reconnaissance, 1981, pp. 69-75.
Wu, "EO Target Geolocation Determination", IEEE Proceedings of the 34th Conference of Decision and Control, Dec. 1995, pp. 2766-2771.
Thomasson, "Guidance of a Roil-Only Camera for Ground Observation in Wind", Journal of Guidance, Control and Dynamics, vol. 21, Jan.-Feb. 1998, pp. 39-44.
Btasch et at, "Integrating GPS/INS and Adaptive Monopulse Music for Position Location", IEEE, 1998, pp. 575-581.
Karatsinides, "Line-of-Sight Pointing . . . Boresighting", IEEE Transactions on Aerospace and Electronic Systems, vol. 36 No. 3, Jul. 2000, pp. 974-982.
Haessig, "Modern Control . . . Stability Problem", IEEE Proceedings of the American Control Conference, Jun. 1995, pp. 1003-1004.
Hofft, Jens et al., "Multispectral EO LOROP camera," SPIE Conference on Infrared Technology & Applications XXIV, San Diego, California, Jul. 1998, SPIE vol. 3436, p. 402-412.
Ibsen et al, "Synthetic Aperture Radar (SSAR) image focus performance during maneuvers", SPIE vol. 2747, 1996, pp. 67-78.
Karatsinides et at, "Analytic Boresight Calibration of a Line-of-Sight Sensor", SPIE Conference on Acquisition, Tracking and Pointing XIII, Apr. 1999, pp. 64-71.
Lareau, "Advancements in E-O Framing", SPIE Conference on Airborne Reconnaissance XXII, SPIEvol. 3431, Jul. 1998, pp. 96-107.
"Cedip Infrared Systems Defense and Security Business Unit" http://www.cedip-infrared.security/produit detail.
Roy et al, "Parametric geometric correction of airborne thematic mapper imagery", Int. J. Remote Sensing, 1997, vol. 18, No. 9, pp. 1865-1887.
Algrain et al, "Accelerometer Based Line-of-Sight . . . Tracking Systems", 2 IEEE Conference on Control Applications, Sep. 1993, pp. 159-163.
Kennedy, "Strapdown Inertial Measurement Units . . . Aperture Radars", IEEE 1988 National Radar Conference, IEEE AES, Oct. 1988, pp. 32-35.
Stimac et al, "Sensor Alignment Kalman Filters for Inertial Stabilization Systems", IEEE Position Location and Navigation Symposium, 1992, pp. 321-344.
Holecz et at, "Radiometric Calibration of Airborne SAR Imagery", IEEE Geometric and Remote Sensing Symposium, 1994, pp. 1096-1098.
Rue, "Precision Stabilization Systems", IEEE Transactions on Aerospace and Electronic Systems, vol. AES-1O, No. 1, Jan. 1974, pp. 34-42.
Uhl B: "Reccelite tactical reconnaissance pod",Airborne Reconnaissance XXV, San Diego, CA. USA. Jul. 30, 2001, vol. 4492, pp. 92-102, XP008022820.
Held K J et al: "Tier II Plus airborne EO sensor LOS control and image geolocation" Aerospace Conference, 1997, pp. 377-405; XP010214630.
Fountain, J. Richard IEEE (1997) pp. 411-416 "Digital Terrain Systems".
Masursky, Harold et al NASA SP-362 (1978) pp. 1-31 "Apollo Over the Moon: A View from Orbit".
Robeck et al, "Precision Pointing Control for an Orbital Earth Observing System", IEEE Control Systems, vol. 11, 1991, pp. 46-52.
Hepburn et al, "Motion Compensation for ASTOR Long Range SAR", IEEE Position Location and Navigation Symposium, 1990, pp. 205-211.
Buckreuss, "Motion Compensation for Airborne SAR based on Inertial Data, RDM and GPS", IEEE Geoscience and Remote Sensing Symposium, 1994, vol. 4, pp. 1971-1973.
Chamberlain et al, "Mega pixel CCD Image Sensor Technology", Electron Devices Meeting 1994, International Technical Digest, pp. 701-704.

Martinsek et al, "Integrated Precision SAR Targeting: a SAR Targeting Simulation", IEEE Aerospace and Electronics Conference, 1998, pp. 407-413.

Majure, "Demonstration of a Ring Laser Gyro System for Pointing and Stabilization Applications", IEEE Position Location and Navigation Symposium, 1990, pp. 219-225.

Berning et al, "Dynamically Sensed Mission Sensor Afignment", IEEE Aerospace and Electronics Conference, 1992, pp. 327-333.

Moroz et al, "Airborne Deployment of . . . Counter Striking System", Proceedings of the IRIS Specialty Group on Passive Sensors, vol. 1, 1999, pp. 99-106.

Meyer, "A Parametric Approach for . . . (AVIRIS) Data in Rugged Terrain", Re mote Sensing Environments, 1994, vol. 49 No. 2.

Aigrain, A Target Location and Pointing Algorithm for a Three-Axis Stabilized Line Scanner (AMIDRAS), SPIE vol. 1304 Acquisition, Tracking, and Pointing IV (1990).

* cited by examiner

AIRBORNE RECONNAISSANCE SYSTEM

CROSS REFERENCE TO RELATED APPLICATIONS

This application is a continuation of U.S. application Ser. No. 11/538,882, filed on Oct. 5, 2006, which is a continuation of U.S. application Ser. No. 10/484,677, filed on Jan. 23, 2004, now U.S. Pat. No. 7,136,726.

FIELD OF THE INVENTION

The present invention relates to a system for carrying out airborne reconnaissance. More particularly, the present invention relates to an airborne reconnaissance system which comprises one or more arrays of light-sensitive sensors, such as V, visible, IR, multi/hyper-spectral, or active illumination, the line of sight of which being directed by means of gimbals having at least two degrees of freedom, said system further uses an Inertial Navigation System (INS) for providing accurate tracking and capturing, and for providing 3D motion compensation. The sensors and INS are preferably mounted on the gimbals.

BACKGROUND OF THE INVENTION

Airborne reconnaissance systems have been widely used for many years now, particularly for obtaining images from the air of areas of interest.

Originally, a film camera was used on board aircraft for capturing the images. The main problem of the airborne, film-camera based reconnaissance system is the length of time required for developing the film, an operation that can be performed only after landing. This problem has been overcome in more modern systems by the use of a one-dimensional vector or a two-dimensional array of light-sensitive sensors in the camera for obtaining electronic images that are then electronically stored within the aircraft, and/or transmitted to a ground base station. This is generally done in such systems by scanning by the light-sensitive sensors of the area of interest in the direction of the flight.

Airborne reconnaissance systems are generally used to obtain images of hostile areas, and therefore the task of obtaining such images involves some particular requirements, such as:
1. Flying the aircraft at high elevations and speeds in order to reduce the risk of being targeted by enemy weapons, and in order to widen the area captured by each image;
2. Trying to capture as much relevant image information as possible during as short as possible flight;
3. Trying to operate under various visibility conditions, while not compromising the resolution of the images and their quality.
4. Trying to photograph rough terrains (e.g., high mountains, areas having sharp ground variations), in high resolution and image quality.

The need for securing the reconnaissance aircraft, while flying above or close to hostile areas has significantly increased flying costs and risks, as sometimes the reconnaissance mission requires escorting of the aircraft by other, fighter aircrafts. Therefore, the need for enabling a short and reliable mission is of a very high importance.

There are several other problems generally involved in carrying out airborne reconnaissance. For example, capturing images from a fast-moving aircraft introduces the need for the so-called Forward Motion Compensation (Hereinafter, the term "Forward Motion Compensation" will be shortly referred to as FMC. Motion Compensation in general will be referred to as MC), to compensate for aircraft movement during the opening of the camera shutter (whether mechanical or electronic; in the latter case, the opening of the camera shutter for the purpose of exposure is equivalent to the integration of light photons by the light-sensitive components).

When light-sensitive sensors are used in the camera (hereinafter, this type of image capturing will be referred to as "electronic capturing" in contrast to "film capturing", wherein a film-type camera is used), three major scanning types are used:

i. The Along-Track Scanning (also known as "push-broom scanning")—In a first configuration of the Along-Track Scanning, the light-sensitive sensors are arranged in a one-dimensional vector (row), perpendicular to the flight direction. The scanning of the imaged area is obtained by the progression of the aircraft. In one specific configuration of Along-Track Scanning, generally called Along-Track TDI (Time Delayed Integration) configuration, a plurality of such parallel one-dimensional vectors (pixel-rows) perpendicular to the flight direction are provided at the front of the camera forming a two-dimensional array. In that case, however, the first row of the array captures an area section, while all the subsequent rows are used to capture the same section, but at a delay dominated by the aircraft progression. Then, for each row of pixels, a plurality of corresponding pixels of all the rows in the array, as separately measured, are first added, and then averaged in order to determine the pixel measured light intensity value. More particularly, each pixel in the image is measured N times (N being the number of rows) and then averaged. This Along-Track TDI configuration is found to improve the signal-to-noise ratio, and to improve the image quality and the reliability of measuring.

ii. The Across-Track Scanning (also known as "Whiskbroom Scanning")—In the Across-Track Scanning, a one-dimensional sensing vector of light-sensitive sensors, arranged parallel to the flight direction, is used. The sensing vector is positioned on gimbals having one degree of freedom, which, during the flight, repeatedly moves the whole vector right and left in a direction perpendicular to the direction of flight, while always keeping the vector in an orientation parallel to the direction of flight. Another Across-Track Scanning configuration uses a moving mirror or prism to sweep the line of sight (hereinafter, LOS) of a fixed vector of sensors across-track, instead of moving the vector itself. In such a case, the Across-Track Scanning of the area by the gimbal having one degree of freedom, while maintaining the forward movement of the aircraft, widens the captured area. Another configuration of the Across-Track Scanning is the Across-Track TDI configuration. In this configuration there exists a plurality of vectors (columns) in a direction parallel to the flight direction, forming a two-dimensional array. This Across-Track TDI, in similarity to the Along-Track Scanning TDI, provides an improved reliability in the measuring of pixel values, more particularly, an improvement in the signal-to-noise ratio.

iii. Digital Framing Scanning: In Digital Framing Scanning, a two-dimensional array of light-sensitive sensors is positioned with respect to the scenery. In U.S. Pat. No. 5,155, 597 and U.S. Pat. No. 6,256,057 the array is positioned such that its column-vectors (a column being a group of the array's columns) are parallel to the flight direction. Forward motion compensation (FMC) is provided electronically on-chip (in the detector focal plane array) by the transferring of charge from a pixel to the next adjacent pixel in the direction of flight during the sensor's exposure time (also called "integration time"). The charge transfer rate is determined separately for each column (or for the whole array as in U.S. Pat. No. 6,256,057 where a slit is moved in parallel to the columns direction), depending on its individual distance (range) from the captured scenery, assuming flat ground. In WO 97/42659 this concept is extended to handle transferring of charge separately for each cell instead of column, a cell being a rectangular group of pixels. In the system of U.S. Pat. No. 5,692,062, digital image correlation between successive frames captured by each column is performed, in order to measure the velocity of the scenery with respect to the array, and the correlation result is used for estimating the average range of each column to the scenery, for the purpose of motion compensation in terrain with large variations. This compensation method requires capturing of three successive frames for each single image, two for the correlation process and one for the final motion-compensated frame. The system of U.S. Pat. No. 5,668,593 uses a 3-axis sightline stepping mechanism for expanding coverage of the area of interest, and it applies a motion compensation technique by means of transferring of charge along columns. U.S. Pat. No. 6,130,705 uses a zoom lens that automatically varies the camera field of view based on passive range measurements obtained from digital image correlation as described above. The field of view is tuned in accordance with prior mission requirements for coverage and resolution.

A significant problem which is characteristic of the prior art reconnaissance systems, particularly said electronically scanning Across-Track and Along-Track scanning methods, is the need for predefining for the aircraft an essentially straight scanning leg (and generally a plurality of such parallel straight legs), and once such a leg is defined, any deviation, particularly a rapid or large deviation, from the predefined leg, is not tolerated, as said systems of the prior art are not capable of maintaining a desired line of sight direction during such a fast and/or large deviation from the predefined leg, resulting in image artifacts such as tearing (dislocation of image lines), smearing (elongation of pixels) or substantial gaps in the image information. This is particularly a significant drawback when carrying out a reconnaissance mission above or close to a hostile area, when the need arises for the aircraft to carry out fast maneuvering to escape enemy detection or targeting. Moreover, sometimes, in order to obtain good imaging of a complicated terrain, such as of a curved canyon, it is best to follow the course of the sharply curved edges of the canyon. However, in most cases the reconnaissance systems of the prior art cannot tolerate carrying out such a sharply curved maneuvering, involving sharp changes in the angles of the line of sight with respect to the photographed scenery.

Another drawback characteristic of the reconnaissance systems of the prior art, for example, U.S. Pat. No. 5,155,597, U.S. Pat. No. 5,692,062, WO 97/42659, and U.S. Pat. No. 6,256,057, is their need to handle vast amounts of data. The systems of the prior art do not enable an easy, selective imaging of small portions of an area of interest. Once operated, the system scans the entire area to which the camera is directed, with essentially no selection of specific portions of the whole possible. Therefore, even for a small area of interest, the systems of the prior art must handle a huge amount of data, i.e., be capable of storing the full image data obtained during the operation of the camera, and transmission of it to the ground (when such an option is desired). The transmission of a huge amount of data to the ground, sometimes in real-time, requires usage of a very wide bandwidth. Another particular problem which evolves from this limitation is the need for distinguishing and decoding a small data of interest within the said full, huge amount of data obtained.

Still another drawback of reconnaissance systems of the prior art, for example, U.S. Pat. No. 5,155,597, U.S. Pat. No. 5,692,062, WO 97/42659, U.S. Pat. No. 6,130,705, and U.S. Pat. No. 6,256,057 is their limited ability to capture images in a wide range of a field of regard. Hereinafter, the term "field of regard" refers to the spatial section within which the camera line of sight can be directed without obscuration. Systems of the prior art sometimes use separate dedicated sensors for different sight directions (e.g. separate sensors for downlooking, side-oblique or forward-oblique). The present invention provides to the aircraft the ability of capturing images, simultaneously from all sensors, of areas forward, backward, sideways and in any other arbitrary direction, and to rapidly switch between these directions.

Yet another drawback of reconnaissance systems of the prior art, for example, U.S. Pat. No. 5,155,597, U.S. Pat. No. 5,668,593, U.S. Pat. No. 5,692,062, WO 97/42659, U.S. Pat. No. 6,130,705, and U.S. Pat. No. 6,256,057 is the use of large-sized two-dimensional sensors' arrays, which becomes a necessity for systems having limited or no control over their line of sight. The present invention enables usage of small or medium-sized, two-dimensional sensors' arrays, by taking advantage of the capability to quickly and accurately move the LOS within a large field of regard, to stably fix the LOS on the ground scenery while capturing an image, and to gather photographic image data by a multitude of small/medium frames rather than one single large frame at a time. A small-sized array would typically be up to 1 megapixels (million pixels), and a medium-sized array would typically be up to 5 megapixels. In contrast, large-sized arrays would typically be up to 50 megapixels and even larger. An important feature of the present invention is that both the small and medium-sized arrays are commercially available as universal sensors' arrays, not designed specifically for reconnaissance applications but rather for commercial applications such as stills and video cameras, and therefore they are widely available from a few vendors at low prices. This sensors' technology also benefits from the enormous investment by vendors in such commercial products due to the demands of the commercial market. In contrast, the large-sized reconnaissance sensors' arrays are uniquely developed by reconnaissance systems manufacturers, are complex due to the need for on-chip motion compensation, are expensive, and are not widely available. The limitations of prior art systems are more acute when the sensor is required to operate at the IR range rather than at the visible range, since the current IR array technology does not provide large-sized IR arrays. Another drawback of large-sized arrays is their lower frame rate with respect to small/medium-sized arrays, due to the large amount of pixels processed for each image.

Some of the prior art systems employ on-chip motion compensation, for example, as described in U.S. Pat. No. 5,155,597, U.S. Pat. No. 5,692,062, and WO 97/42659. Several drawbacks are associated with the on-chip motion compensation concept. On-chip motion compensation is performed by transferring charges from one column/cell to an adjacent column/cell during the integration time at a specified rate. This process of transferring charges induces electronic noises and creates an ambiguity (resulting in smearing or loss of pixels) at the borders between columns/cells and at the edges of the chip, since the required charge transfer rate may be different between adjacent columns/cells. Some of the prior art systems assume flat and horizontal ground for estimating the range from the sensor to each part of the scenery in the captured image (i.e. longer range for the farther portion of the scenery and shorter range for the closer portion), and calculate the motion compensation rate based on simple aircraft velocity and attitude information with respect to the flat ground. When the terrain has large variations this generally results in substantial smearing as shown in example 1 of the present invention. In some cases, the sensor must be oriented during capturing so that its columns are accurately parallel to the flight direction without rotation, whereby any deviation from that orientation will result in further smearing, thus seriously limiting mission planning. The more advanced prior art systems use digital image correlation between successive frames for each cell in the chip, in order to estimate more accurately the range to the scenery for each cell. This process requires three successive image captures for each usable image, thus wasting system duty cycles. The correlation accuracy is limited by smearing of the first two images when photographing a terrain with large variations. Another problem associated with correlation is the large change of aspect angle with respect to the scenery between the two successive images. For example, an aircraft flying at a velocity of 250 m/s at a range of 15 km to the scenery in side oblique, using a chip with 2 Hz frame rate, will have an LOS angular velocity (sometimes called V/R) of 250/15=16.7 milirad/s, resulting in an aspect angle between successive images of 8.3 milirad. For a typical pixel Instantaneous FOV (IFOV) of 30 microrad this means a shift of 277 pixels in the image. Moreover, since the value of V/R is not constant at any time during the mission, especially when the aircraft is maneuvering, the elapsed time between the two successive images will induce an additional error.

Some of the prior art systems employ a step framing method to cover large areas, for example, as described in U.S. Pat. No. 5,668,593. The step framing method does not provide mechanical/optical fixing of the LOS on the scenery during exposure time, and has a limited field of regard. On-chip motion compensation is used, but inaccuracies are induced due to vibrations of the aircraft, and delays in transferring the measurement of the vibrations to the reconnaissance system.

It is therefore an object of the present invention to provide a reconnaissance airborne system capable of tolerating and compensating for very sharp maneuvers of the aircraft and for large terrain variations, while still providing high resolution and reliable images of the area of interest, within a very wide field of regard.

It is still another object of the present invention to provide a reconnaissance system in which the amount of irrelevant data is significantly reduced, therefore reducing work needed for distinguishing relevant data from the fully obtained data, and reducing airborne and ground image storage and communication requirements.

It is still another object of the present invention to enable the defining of very small areas of interest within a large area (i.e., a field of regard), of which images can be obtained.

It is still another object of the present invention to reduce the communication load between the aircraft and a ground base station, when communicating images from the aircraft to the ground.

It is still another object of the present invention to provide an airborne reconnaissance system with the ability to capture images in a wide range of the angle of sight (i.e., a wide field of regard).

It is still another object of the invention to provide a new and efficient manner of obtaining the images required for creating stereoscopic-view images.

It is still another object of the invention to provide the capability of combining in the same reconnaissance mission both manual mode operation and automatic mode operation.

Other objects and advantages of the present invention will become apparent as the description proceeds.

SUMMARY OF THE INVENTION

The present invention relates to an airborne reconnaissance system which comprises: a. Gimbals having at least two degrees of freedom; b. At least one array of light sensors positioned on the gimbals for being directed by the same within at least two degrees of freedom; c. Map storage means for storing at least one Digital Elevation Map of an area of interest, divided into portions; d. Inertial Navigation System for real-time providing to a gimbals control unit navigation and orientation data of the aircraft with respect to a predefined global axes system; e. Portion selection unit for selecting, one at a time, another area portion from the area of interest; f. Servo control unit for:

A. Receiving from said Digital Elevation Map one at a time, a coordinates set of the selective area portion, said set comprising the x:y coordinates of said area portion and the elevation z of the center of that portion;
B. Receiving continuously from said inertial navigation system present location and orientation data of the aircraft;
C. Repeatedly calculating and conveying into a gimbals servo unit in real time and at a high rate signals for:
   a. during a direction period, signals for directing accordingly the gimbals including said LOS of at least one array of light-sensing units towards said x:y:z coordinates of the selected area portion, and;
   b. during an integration period in which the array sensors integrate light coming from the area portion, providing to the gimbals unit signals for compensating for the change in direction towards the x:y:z coordinates of the selected portion evolving from the aircraft motion;
   g. Gimbals servo for effecting direction of the gimbals in at least two degrees of freedom according to the signals provided from said Servo Control Unit; h. Sampling means for simultaneously sampling at the end of the integration period pixel levels from each of said array sensors, a set of all of said sampled pixel levels forms an image of said area portion; and i. Storage means for storing a plurality of area portion images.

Preferably, said one or more arrays are selected from at least a visual light-sensitive array, a UV light sensitive-array, an infrared light-sensitive array, a multi/hyper-spectral array, and an active illumination array.

Preferably, said navigation data of the aircraft comprises data relating to the 3D location of the aircraft, and its velocity and acceleration vectors with respect to a predefined coordinates system, and its orientation data relating to the orientation of the aircraft with respect to said predefined coordinate system.

Preferably, said Inertial Navigation System comprises velocity, acceleration, and orientation sensors, at least some of said sensors being positioned on the gimbals.

Preferably, at least some of said arrays of sensors are positioned on the gimbals.

Preferably, the system uses two Inertial Navigation Systems, the first inertial navigation system being the main Inertial Navigation System of the aircraft and its sensors being positioned within the aircraft, and the second Inertial Navigation System being an a system dedicated to the reconnaissance system, at least some of the sensors of said second Inertial Navigation System being positioned on the gimbals unit, measuring navigation and orientation data of the gimbals with respect to the said predefined axes system, for better eliminating misalignments occurring between the gimbals and LOS and the said main Inertial Navigation System of the aircraft due to aero-elastic deflections and vibrations of the aircraft, by using a process of transfer alignment from the said first INS to the said second INS.

Preferably, the Digital Elevation Map is a map comprising a grid of the area of interest, the x:y:z coordinate values at each of the nodal points in said grid being provided by said map.

Preferably, the portion selecting unit is used for calculating and determining a center of a next area portion such that provides a predefined overlap between the said imaged area portion and the adjacent previously imaged area portion.

Preferably, in an automatic mode of operation the gimbals are activated to cover in a sequential, step-wise manner, the area of interest, said coverage is made from a predefined starting portion and according to a stored mission plan, thereby sequentially scanning one after the other area portions of the area of interest, and sampling images from each of said portions.

Preferably, in a manual mode of the system the pilot of the aircraft defines an area of interest during the flight, said area of interest being automatically divided into at least one area portion, all the area portions being automatically scanned one after the other by means of correspondingly directing to them the on-gimbals array, for capturing images of each of said scanned portions.

Preferably, the gimbals comprise two gimbals mechanisms, an external gimbals mechanism and an internal gimbals mechanism.

Preferably, the external gimbals mechanism is used for coarse directing the on-gimbals array to the center of a selected area portion.

Preferably, the external gimbals mechanism has two degrees of freedom, elevation and roll.

Preferably, the internal gimbals mechanism is used for fine directing the on-gimbals array to the center of a selected area portion, particularly for compensating the gimbals direction for the aircraft motion and orientation change during the integration period.

Preferably, the internal gimbals mechanism has two degrees of freedom, yaw and pitch.

Preferably, the external gimbals mechanism is slaved to the internal gimbals mechanism.

Preferably, during the integration period each of the array sensors simultaneously senses light from a corresponding section of the area portion, and at the end of the integration period the data from all the array sensors is read simultaneously, and stored as an image of the area portion.

Preferably, the arrays of light sensors are sensitive to light in the range of visual light, IR, UV, multi/hyper-spectral, and/or an active illumination.

Preferably, the arrays are focal plane arrays.

Preferably, the predefined axes system is a global axes system.

In one embodiment of the invention, the system of the invention is assembled within a pod attached to the aircraft.

In another embodiment of the invention, the system of the invention is assembled within a payload installed inside the aircraft with only its windows protruding for obtaining a clear, unobstructed Line Of Sight.

Preferably, the gimbals are located at the front of the pod, behind a transparent window.

In an embodiment of the invention, the system further comprising a back-scanning mechanism comprising a mirror or prism, positioned on the gimbals and rotatable with respect thereto, light coming from the area portion first passing through said mirror which deflects the same towards the array, and: a. the servo control unit applies to the gimbals a continuous row and/or column scanning movement without stopping; and b. while the direction towards an area portion is being established, applying to said back-scanning mirror during the integration period an opposite direction movement with respect to said row and/or column scanning continuous movement, thereby compensating for that continuous movement and ensuring a fixed orientation relationship of the array with respect to the area portion imaged.

The invention further relates to a method for carrying out airborne reconnaissance, which comprises: a. Providing at least one array of light-sensitive pixels; b. Mounting the at least one array on gimbals having at least two degrees of freedom so that the gimbals can direct the array to a selected Line Of Sight; c. Providing a Digital Elevation Map of an area of interest, reconnaissance images from said area are to be obtained; d. Providing an Inertial Navigation System for obtaining at any time during the flight the updated $x_a:y_a:z_a$ coordinates of the center of the array with respect to a predefined coordinates system; e. Providing a calculation unit for, given $x_p:y_p$ location coordinates of a center of specific area portion within the area of interest, and the $z_p$ elevation coordinate at said portion center as obtained from said Digital Elevation Map, and the said $x_a:y_a:z_a$ coordinates of the array center at same specific time, determining the exact angles for establishing a line of sight direction connecting between the center of the array and the said $x_p:y_p:z_p$ coordinates; f. Given the calculation of step e, directing accordingly the center of the array's Line Of Sight to the center of the area portion; g. During an integration period, effecting accumulation of light separately by any of the array light sensors; h. During the integration period, repeating at a high rate the calculation of step e with updated array $x_a:y_a:z_a$ coordinates, and repeatedly, following each said calculation, correcting the direction as in step f; i. At the end of the integration period, sampling all the array sensors, and saving in a storage as images of the array portion; j. Selecting new portion coordinates $x_p:y_p:z_p$ within the area of interest, and repeating steps e to j for these new coordinates; and, k. When the coverage of all the area of interest is complete, terminating the process, or beginning coverage of a new area of interest.

Preferably, the selection of $x_p:y_p$ coordinates of a new area portion is performed to assure overlap between adjacent area portions within a predefined range, by calculating the 3-dimensional footprint of the new area portion on the ground, and then projecting it on the footprint of a previous area portion.

Preferably, the overlap assurance is obtained by a trial and error selection, overlap calculation, and correction when necessary, or by an exact analytical calculation.

Preferably, at least some of the sensors of the Inertial Navigation System are positioned on the gimbals, for improving the measuring of the orientation of the array with respect to the selective area portion.

Preferably, at least some of the light sensitive sensors are positioned on the gimbals, for improving the measuring of the orientation of the Line Of Sight with respect to the selective area portion.

Preferably, the Inertial Navigation System comprises a dedicated Inertial Navigation System of the reconnaissance system and the main Inertial Navigation System of the aircraft, to improve the measuring of the orientation of the array with respect to the selective area portion, by using a process of transfer alignment from the aircraft Inertial Navigation System to the dedicated reconnaissance system's Inertial Navigation System.

The invention further relates to a method for providing motion compensation during airborne photographing which comprises: a. Providing at least one array of light-sensitive pixels; b. Mounting the at least one array on gimbals having at least two degrees of freedom so that the gimbals can direct its Line Of Sight towards a selective area portion; c. Providing a Digital Elevation Map of an area of interest, reconnaissance images from said area are to be obtained; d. Providing an Inertial Navigation System for obtaining at any instant during flight the updated $x_a$:$y_a$:$z_a$ coordinates of the center of the array with respect to a predefined coordinates system; e. Providing a calculation unit for, given $x_p$:$y_p$ location coordinates of a center of specific area portion within the area of interest, and the $z_p$ elevation coordinate at said portion center as obtained from said Digital Elevation Map, and the said $x_a$:$y_a$:$z_a$ coordinates of the array center at same specific time, determining the exact angles for establishing a line of sight direction connecting between the center of the array and the said $x_p$:$y_p$:$z_p$ coordinates; f. During an integration period, when the center of the array's Line Of Sight is directed to a center of an area portion effecting accumulation of light separately by any of the array light sensors; g. During the integration period, repeating at a high rate the calculation of step e with updated array $x_a$:$y_a$:$z_a$ coordinates, and repeatedly, following each said calculation, correcting the direction by keeping the center of the array directed to the center of the selected area portion, therefore compensating for aircraft movement; and h. At the end of the integration period, sampling all the array sensors, and saving in a storage as images of the array portion.

The invention further relates to a method for carrying out airborne targeting, which comprises:
 a. Providing at least one weapon;
 b. Mounting the at least one weapon on gimbals having at least two degrees of freedom so that the gimbals can direct the weapon to a selected Line Of Sight;
 c. Providing a Digital Elevation Map of an area of interest, selected targets within said area are to be obtained;
 d. Providing an Inertial Navigation System for obtaining at any time during the flight the updated $x_a$:$y_a$:$z_a$ coordinates of the center of the weapon with respect to a predefined coordinates system;
 e. Providing a calculation unit for, given $x_p$:$y_p$ location coordinates of a center of specific target within the area of interest, and the $z_p$ elevation coordinate at said target center as obtained from said Digital Elevation Map, and the said $x_a$:$y_a$:$z_a$ coordinates of the weapon center at same specific time, determining the exact angles for establishing a Line of Sight Direction connecting between the center of the weapon and the said $x_p$:$y_p$:$z_a$ coordinates;
 f. Given the calculation of step e, directing accordingly the center of the weapon Line Of Sight to the center of the target;
 h. During the effective targeting and shooting period, motion compensating for the motion of the aircraft.

The motion compensation of the targeting can be made in any conventional manner known in the art. According to an embodiment of the present invention the motion compensation of step h is carried out by repeating at a high rate the calculation of step e with updated target $x_a$:$y_a$:$z_a$ coordinates, and repeatedly, following each said calculation, correcting the direction as in step f.

DETAILED DESCRIPTION OF PREFERRED EMBODIMENTS

Figure 1:
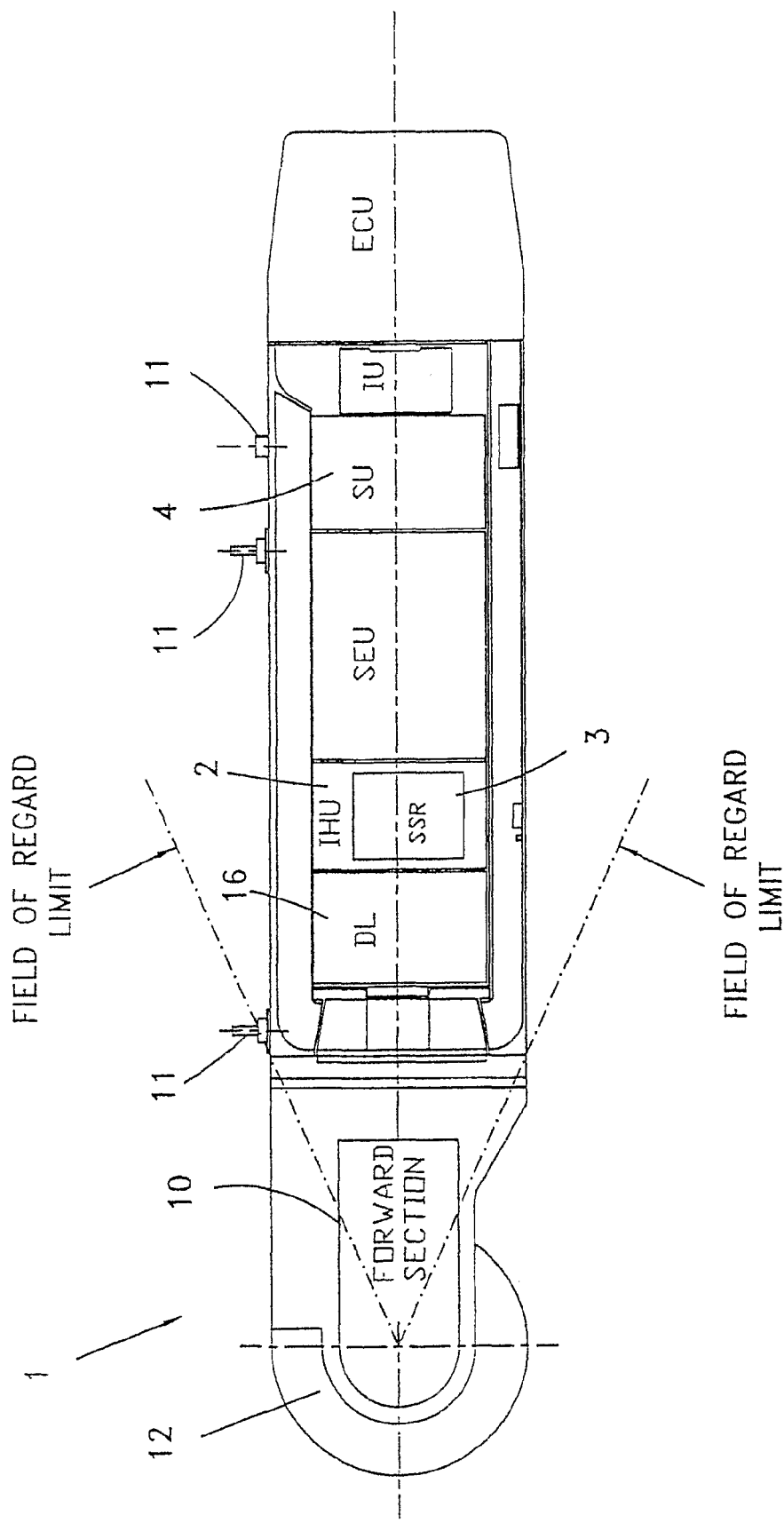
FIG. 1 shows a general structure of a reconnaissance system, assembled within a pod, according to one embodiment of the invention.

A preferred embodiment of the reconnaissance system of the present invention is particularly characterized by the following main features:
 i. The one or more focal plan arrays that are used to sense and capture images from an area of interest have a line of sight (LOS) that is directed by gimbals having at least two degrees of freedom. The term 'gimbals', when used herein, refers to any type of mechanism, whether mechanical, optical (such as one including mirrors, prisms, etc.) or a combination thereof, which is capable of moving a line of sight of an array of light-sensitive sensors in at least two degrees of freedom. A mechanical mechanism is sometimes called 'payload-stabilized gimbals'; an optical mechanism is sometimes called 'mirror-stabilized gimbals'. One of said arrays may sense in the visual range, and another may sense, for example, in the IR range, and/or the UV range. In another case, a multi/hyper spectral array or an active illumination array may be used. Hereinafter, throughout this application, the term "array" refers to any type of array of light-sensing means for obtaining an image from an area of interest. The arrays used in the invention may be of small or medium size, rather than large arrays which are used in prior art systems as are used in U.S. Pat. No. 5,155,597, WO 97/42659, and U.S. Pat. No. 6,256,057, taking advantage of the flexibility of the system in taking many snapshots at arbitrary line of sight directions, and with sharply varying terrain conditions. The preferred mounting of the sensors' arrays and their optics, when payload-stabilized gimbals are used, is on the gimbals; in case of mirror-stabilized gimbals, the sensors are mounted off the gimbals.

ii. The reconnaissance system uses an Inertial Navigational System (INS) for continuously calculating the direction of the line of sight. In a preferable case, two INS systems are used: the first one is the main INS of the aircraft, and the second INS is an internal, dedicated INS of the system mounted in the reconnaissance system. The reconnaissance system of the invention continuously receives from the said Inertial Navigation Systems both navigational information regarding the location of the aircraft with respect to a fixed, predefined global axes system, and orientation information of the aircraft with respect to the ground, for point-directing the one or more arrays positioned on the gimbals to any desired area portion on the ground within the field of regard of the aircraft. The preferred mounting of the system INS is on the gimbals, whether payload-stabilized or mirror-stabilized gimbals.

iii. The gimbals having at least two degrees of freedom, on which the arrays are preferably mounted, in one mode of the invention are systematically activated in a step-wise manner for sequentially scanning one after the other area portions of an area of interest, within a very large field of regard.

iv. The system of the invention captures by its arrays, when activated, a snap-shot, two-dimensional image of an area portion, enabling long exposure times due to the compensation of the line of sight motion;

v. When directed to an area portion, three-dimensional motion compensation is provided by means of adjusting the gimbals to keep track with the relevant area portion by means of data provided from the INS, and from a Digital Elevation Map of the area of interest, which is pre-stored in the reconnaissance system of the invention; and vi. In a preferable case, the division of the area of interest into area portions is performed in real-time, wherein the size of each area portion depends on several parameters, such as the shape of the terrain, and the range from the aircraft to the center of the area of interest, as determined from the Digital Elevation Map (DEM), particularly for assuring proper overlap between images of area portions.

The above main features, as well as other structural features of the invention, will become apparent as the description proceeds.

As said, reconnaissance systems of the prior art of the Along-Track or Across-Track scanning type, relate to the accumulated data of a specific leg as an essentially one-piece data. More particularly, once a leg is defined, while the aircraft flies along the leg, the accumulated data is essentially stored as one huge image file. Later, it is up to the operator to distinguish specific relevant data from this image. Furthermore, any airborne reconnaissance system must deal with the problem of motion compensation. As this latter problem is complicated, the solution provided in systems of the prior art do not allow for sharp maneuvering of the aircraft during the reconnaissance mission. The present invention provides a solution to said two problems in a compact and efficient manner.

The reconnaissance system of the present invention is particularly adapted to be carried by a fighter aircraft, where environmental conditions, maneuvering dynamics, system size, aerodynamic limitations, and angular aspects with respect to the ground are extreme; however, the system is also suitable for other airborne platforms. In a preferable case, the system is assembled within a pod or a payload that is generally carried below the aircraft wing or fuselage. Because of the extreme operating conditions of a fighter aircraft, systems of the prior art, for example as disclosed in U.S. Pat. No. 5,668,593 sometimes use a mirror to direct the LOS, a solution which limits the FOR substantially since a mirror essentially folds the LOS to point at a certain direction with relatively small angular variations. In the present invention the LOS is directed by means of the gimbals, a solution that enables a very wide field of regard since gimbals can be rotated towards any direction.

FIG. 1 shows the general structure of a reconnaissance system, assembled within a pod, according to one embodiment of the invention. The pod 1 comprises in its forward section 10 gimbals (not shown) carrying light-sensing arrays and the necessary optics (not shown). The said gimbals and optics are mounted behind a transparent window 12. At least one of such arrays exists, for example, in a CCD-type array, or a focal plan array for sensing light in the visual range. Optionally, more arrays may be included, for example, an IR array for sensing and capturing an image in the IR range. The plurality of arrays, when used, as well as the INS, are positioned on the same portion of the gimbals in such a manner as to be directed to, and cover exactly a same area portion. Optionally, in a less preferred embodiment, the sensors and/or INS may be located behind the gimbals, while the gimbals carry a set of mirrors and/or prisms that folds the LOS towards the sensors. The system further comprises an Image Handling Unit (IHU) 2 that processes the digital image information from the sensors, compresses the images, and combines them with mission data to facilitate later interpretation in the ground station, a Solid State Recorder (SSR) 3 or a similar fast-access storing device for storing a Digital Elevation Map (DEM) of the area of interest and a mission plan, and for recording the captured images. The system further comprises a Servo Unit (SU) for providing control and power signals to the gimbals servo, and an Interface Unit (IU) for enabling power interfaces with the aircraft. Other computer system and control electronics is included within the System Electronics Unit (SEU). Optionally, a Data Link 16 (DL) is used to transmit images and mission data to a ground station for near real-time interpretation. The pod is attached to the aircraft by means of lugs 11.

Figure 1A:
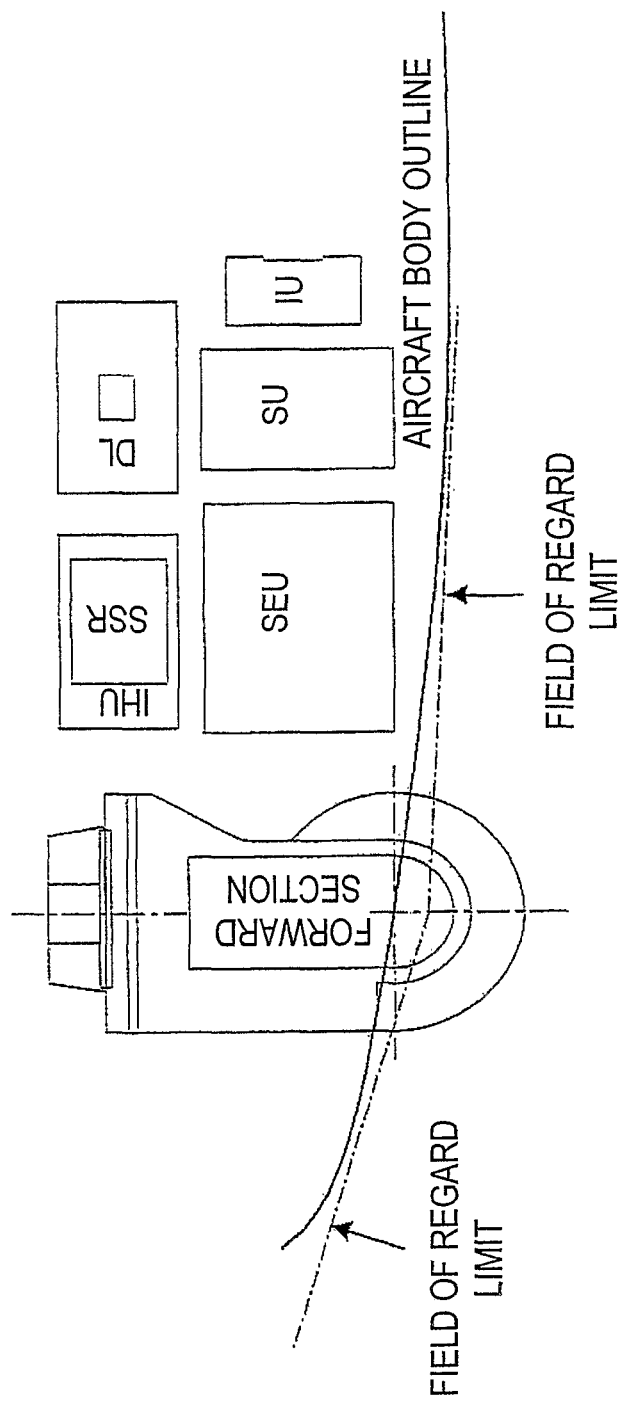
FIG. 1A shows another embodiment of the invention. In this configuration the reconnaissance system is assembled as a payload into the aircraft body.

FIG. 1A shows another embodiment of the invention. In this configuration the reconnaissance system is assembled as a payload into the aircraft body. The Forward Section is positioned vertically and is pointing down, with only its windows protruding outside the aircraft body. The same electronic units as in the pod configuration are installed inside the aircraft body. Although this solution may be used by a fast jet aircraft, its main objective is for other types of aircraft such as helicopters, RPVs (remotely piloted vehicles), and command & control aircrafts.

Figure 2:
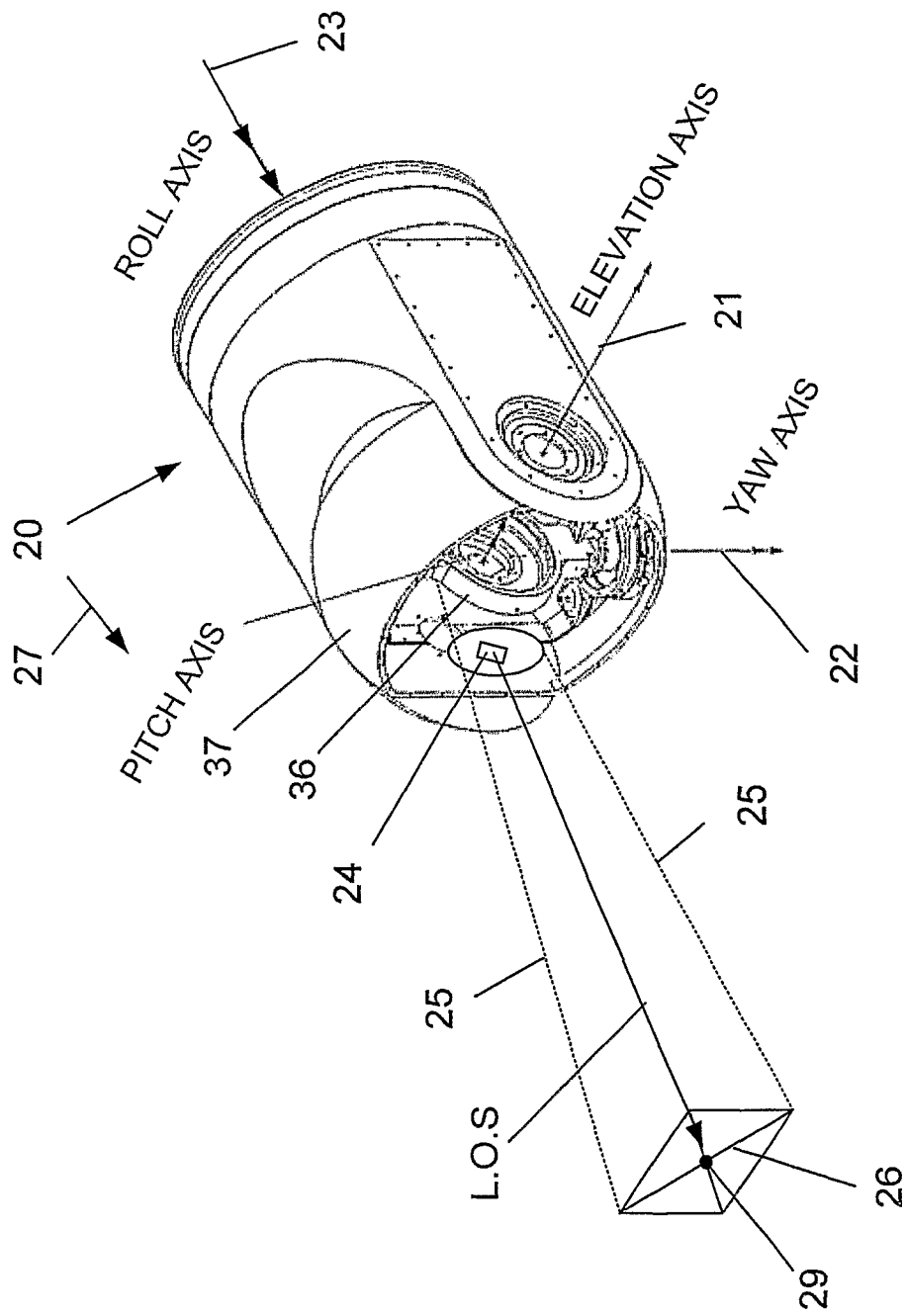
FIG. 2 shows the mechanical structure of a gimbals system according to one embodiment of the invention.

FIG. 2 shows the mechanical structure of the gimbals system 20, according to a preferred embodiment of the invention. The progression direction of the aircraft is indicated by numeral 27. As said, in order to carry out reconnaissance, the gimbals system according to the present invention has at least two degrees of freedom. The direction of the gimbals' axes and the gimbals' order are not important, provided they are capable of steering the LOS towards any spatial direction within their specified field of regard.

According to a preferred embodiment of the invention shown in FIG. 2, the gimbals system 20 comprises two sub-mechanisms, as follows:

Internal gimbals mechanism 36, having two degrees of freedom, Yaw (rotation around axis 22) and Pitch (rotation around axis 21); and External gimbals mechanism 37, having two degrees of freedom, elevation (rotation around axis 21) and roll (rotation around axis 23).

The Pitch and the Elevation degrees of freedom relate essentially to a rotation about a same axis 21. However, the Pitch degree of freedom relates to a fine rotation by the internal gimbals mechanism 36, while the Elevation degree of freedom relates to a coarse rotation of the external gimbals mechanism 37. The external gimbals mechanism 37 is preferably slaved to the internal gimbals mechanism 36. Slaving is the process by which the internal gimbals are the prime gimbals to which LOS steering commands are directed, while the external gimbals are compensating for the internal gimbals' limited angular rotation by following the movement of the internal gimbals, always trying to minimize the angular displacement between the internal and external gimbals. Although tracking to any specific point in front and below the pod is possible by means of two degrees of freedom, the separation into two sub-mechanisms is made in order to obtain a better tracking precision and wider field of regard. The external gimbals mechanism is particularly used for coarse tracking, for example, for transferring the direction of the gimbals from one area portion to a second area portion, while the internal gimbal mechanism is particularly used for providing motion and orientation compensation, while capturing an image of a specific area portion. Other gimbals' arrangements, with different number of gimbals or different direction of axes, may also achieve these goals.

As said, the external gimbals facilitate expansion of the field of regard (FOR). The limits of the FOR for a pod embodiment are indicated on FIG. 1. This FOR is achieved by the ability of the external elevation gimbals to look backward as well as forward, combined with the ability of the roll gimbals to rotate a full turn of 360 degrees. The limits of the FOR for a payload embodiment are indicated on FIG. 1A. This FOR is achieved by the ability of the external elevation gimbals to look sideways as well as downward, combined with the ability of the roll gimbals to rotate a full turn of 360 degrees. The only limitation to the FOR in both embodiments are the pod body and aircraft body, which obscure the line of sight at the edges of the FOR envelop.

In the preferred embodiment of the invention of FIG. 2, the one or more arrays are mounted on the internal gimbal, to provide fine adjustment of the array towards a specific portion of an area of interest. This is required, for example, to provide motion and orientation compensation.

As said, the one or more arrays of sensors, together with their associated optics, are positioned on the gimbals to maintain at least two degrees of freedom. In the embodiment of FIG. 2, an exemplary focal plane array 24 capable of capturing images in the visual range, is symbolically indicated. The boundaries of the sensor's field of view (FOV) are symbolically indicated by numerals 25, and the scene captured by the array is symbolically indicated by numeral 26. According to the present invention, when the scene 26 is a selected area portion, the gimbals system directs the center of array 24 towards center 29 of area portion 26, the line connecting the center of the array to the center of the selected area portion will be referred to herein as "line of sight" (LOS). The sensors' optics may be either separate optics for each sensor, or shared optics for all/some of the sensors. Shared optics collects light in a multi-spectral range and then splits it to each of the sensors according to its unique spectral waveband. The use of separate versus shared optics will depend on the specific design goals, taking into consideration available space and required performance, modularity and maintainability.

Inertial Navigation Systems are well known in the art, and are widely used in aircraft and in airborne systems for determining with high precision in flight the aircraft or airborne-system location, its velocity and acceleration vectors, and its orientation with respect to a stationary, global axes system. The Inertial Navigation System comprises essentially two separate units (i.e functions), a Navigational Unit, for determining the location coordinates of the aircraft or airborne-system, and an Inertial Unit for determining, among others, the aircraft or airborne-system orientation with respect to a predefined, fixed, and generally global coordinate system. The INS may also provide the velocity and acceleration vectors of the aircraft or airborne-system. The Navigational System may use, for example, GPS information, and the Inertial Unit generally uses inertial sensors within the aircraft or airborne-system. Sometimes, a less accurate INS in an airborne system is communicating with a more accurate INS in the aircraft, and aligns itself continuously to the aircraft INS by using data received from it. The process is called 'transfer alignment', and is used by many systems to align two INS's (e.g. to align a missile's INS before dropping it from the aircraft). Once aligned, the less accurate INS further calculates independently the line of sight direction (angles) with respect to a global reference system, until the next alignment occurs.

Figure 3:
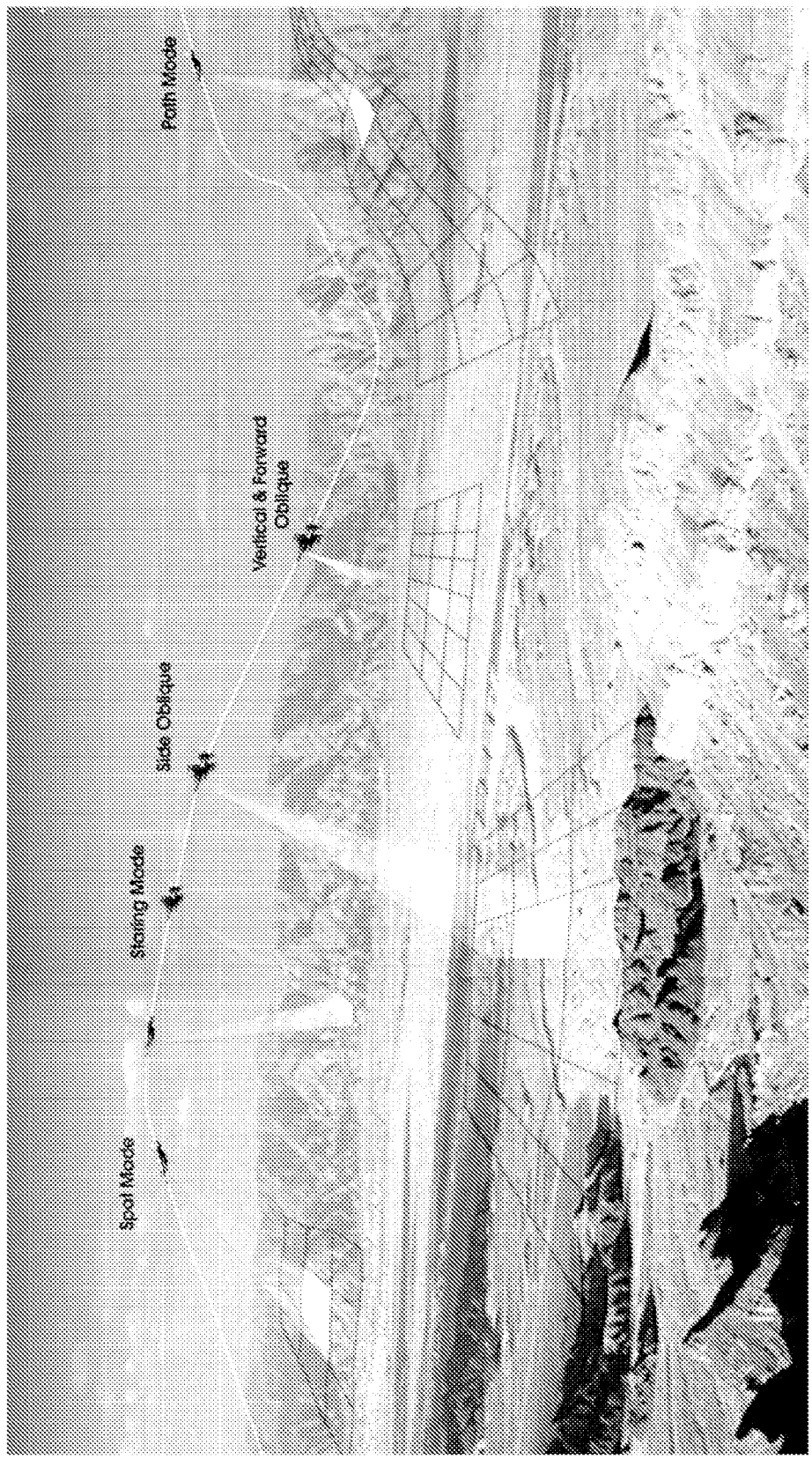
FIG. 3 illustrates several modes of operation, typical to the system of the invention.

According to a preferred embodiment of the invention, the reconnaissance system may have various modes of operation, deriving from its capability to direct the LOS towards any desired direction with the system's field of regard. Referring to FIG. 3B, the LOS directions may be side-oblique, forward-oblique, down-looking or arbitrary. Referring to FIG. 3, the following modes of operation may typically be used:

i. Path Mode: Images are captured along the flight path of the aircraft, with the line of sight directed forward oblique, down looking or side oblique. The path trajectory follows the actual aircraft flight path.

ii. Strip Mode: A linear strip positioned along the flight path, or at an angle to it, is captured. In this mode the line of sight is usually directed side oblique.

iii. Spot Mode: Images of a selected area are captured. In this mode the line of sight may be directed in any arbitrary direction.

iv. Staring Mode: Images of the same selected area are taken successively. In this mode the line of sight may be directed in any arbitrary direction.

In the last three modes, when the aircraft is approaching the selected area, the entrance observation angle may be any angle (i.e. start capturing well before arriving), and when the aircraft is leaving the selected area, the exit observation angle may be any angle (i.e. stop capturing well after leaving). This way, the reconnaissance system may linger more time on the selected area.

Basically, the reconnaissance system may work at either automatic mode or manual mode, and combine both in the same mission. In automatic mode, the reconnaissance system provides automatic acquisition of reconnaissance imagery of preplanned targets and targets of opportunity. The modes selected for the system may contain any combination of path, strip, spot, and staring modes. Based on the mission plan, the system automatically configures the sensors as the aircraft approaches the targets' area, activates the selected sensors, controls the sensors' direction, and initiates/terminates recording and transmission of image data. The planning of the mission is done in advance at the ground station, and is uploaded to the system prior to the mission. In manual mode, the operator can manually change the mission plan during flight. The operator may interrupt an automatic operation and perform reconnaissance functions manually. All modes of operation may be available in both automatic and manual modes.

Figure 3A:
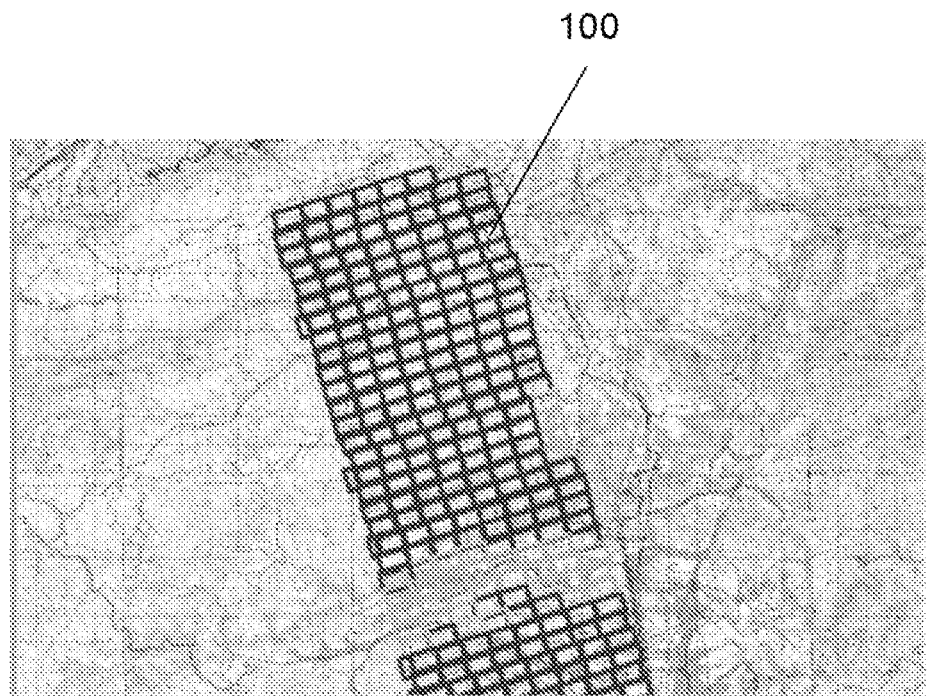
FIG. 3A shows an area of interest divides into a plurality of area portions, according to an embodiment of the invention.
Figure 3B:
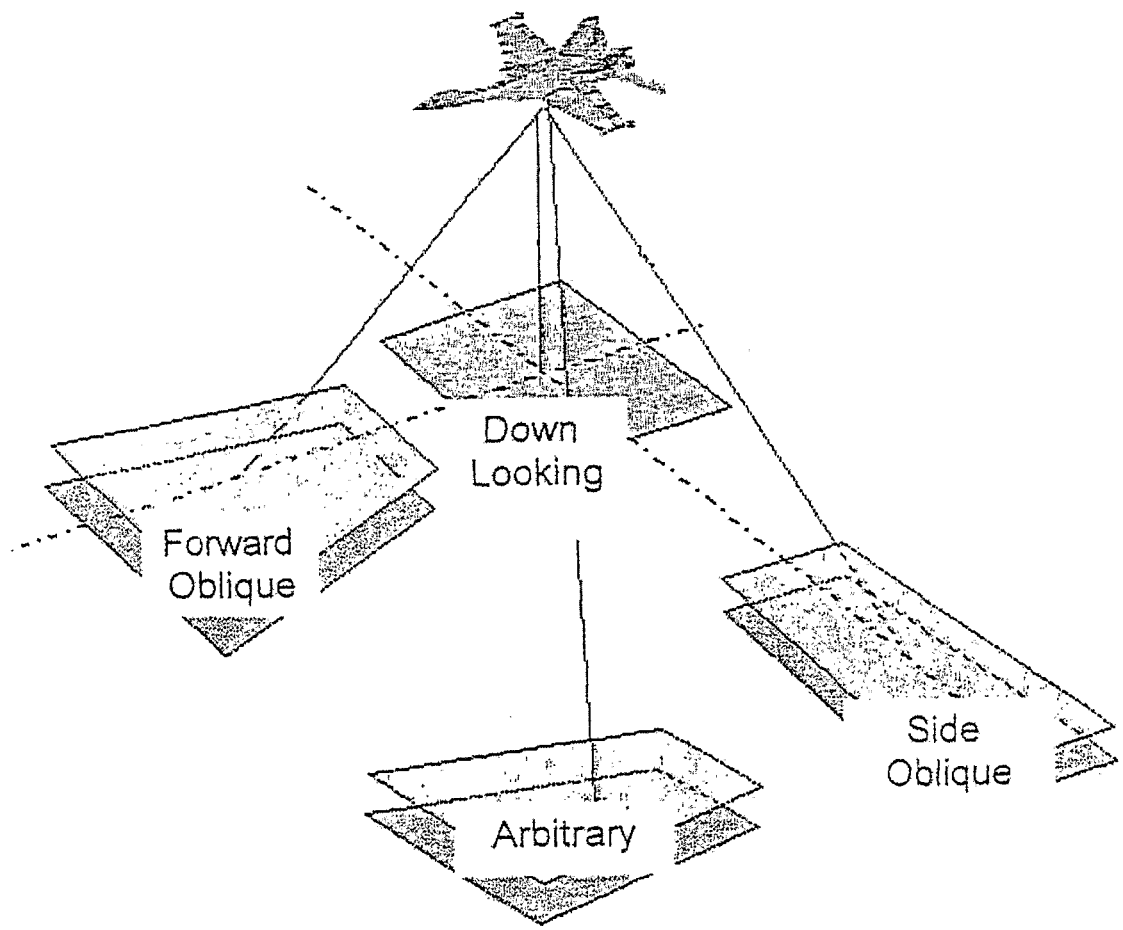
FIG. 3B illustrates several staring modes which are possible by the system of the invention.
Figure 11:
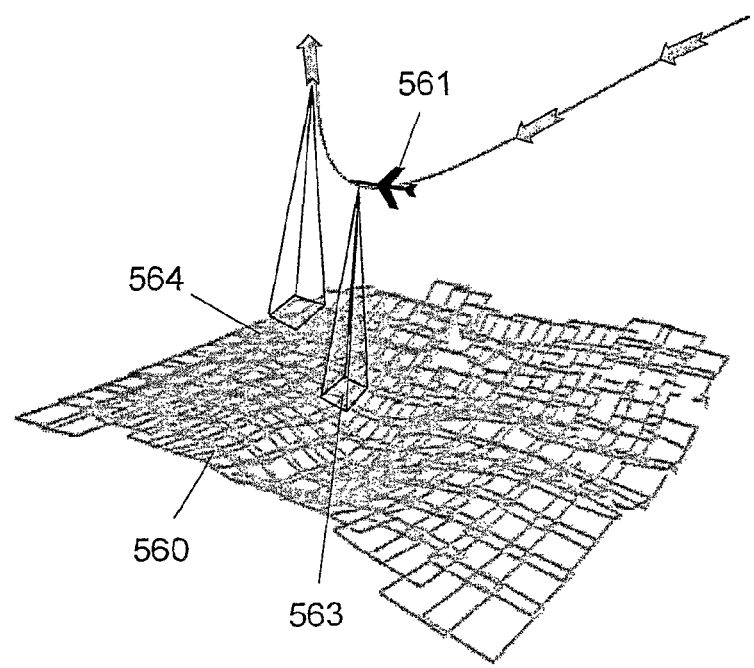
FIG. 11 is a perspective illustration of a hilly terrain, and its division into area portions, including some overlap between area portions, as performed by the system of the present invention.

Referring to FIGS. 3 and 3A, according to a preferred embodiment of the invention, an area of interest is divided into a matrix of a plurality of area portions. For example, area 100, which is defined by points A, B, C, and D, is divided into a matrix of a plurality of area portions, for example, portions $P_{1,1}$, $P_{1,2}$, $P_{1,3}$, $P_{2,1}$, $P_{2,2}$, $P_{2,3}$, ... $P_{n,m}$, wherein the first subscripted number indicates the portion column within the matrix, and the second subscripted number indicates the portion row within the matrix area. Area 100 may assume any arbitrary quadrangular shape as desired by the mission plan. The size of the area portions $P_{n,m}$ varies in accordance with the sensors' FOV and range to the scene of each area portion. In some cases, and as will be elaborated later, the area matrix is defined in such a manner that area portions partially overlap one another, as is shown in FIG. 11, for example, by about 10-20% of their area in order to assure full coverage of the area of interest, even when the area is a sharply changed terrain. When stereo photography is required, an overlap larger than about 56% is required. During the aircraft 102 flight, the gimbals of the reconnaissance system scan the area matrix 100 in a sequential, systematic, step-wise manner, by which the gimbals first direct the imaging array of it to a first area portion and capture its image simultaneously in all sensors, then to a second area portion to capture its image, and then, repeating this procedure, the gimbals sequentially "jump" the line of sight and field of view of the array through all the other portions, until completely capturing images of all the portions of the area of interest 100. For example, the system may scan the exemplary 9-portion matrix 100 in the following order: $P_{1,1}$, $P_{1,2}$, $P_{1,3}$, $P_{2,1}$, $P_{2,2}$, $P_{2,3}$, $P_{3,1}$, $P_{3,2}$, $P_{3,3}$. When the gimbals of the system direct the light-sensitive array to a specific area portion, generally by directing the center of the array towards the center of the specific area portion and locking (i.e fixing the LOS) on it, a "snapshot" is taken, capturing the image of this area portion. More particularly, the "snap shooting" involves two stages, a light integration stage during which light from the area of interest is sensed by components of the array, and a sampling stage during which all the components of the array are simultaneously sampled at the end of the integration period. As said, this procedure is sequentially and systematically repeated for all the area portions of the area 100. Each time an image of a portion is captured, it is saved in a storage at the reconnaissance system (such as the Solid State Recorder 3 of FIG. 1), and optionally also transmitted to a ground base station (not shown) using a Data Link (DL). In order to provide accurate capturing of the image, location and navigation data are provided in real-time to the gimbals control unit by the INS.

Figure 4:
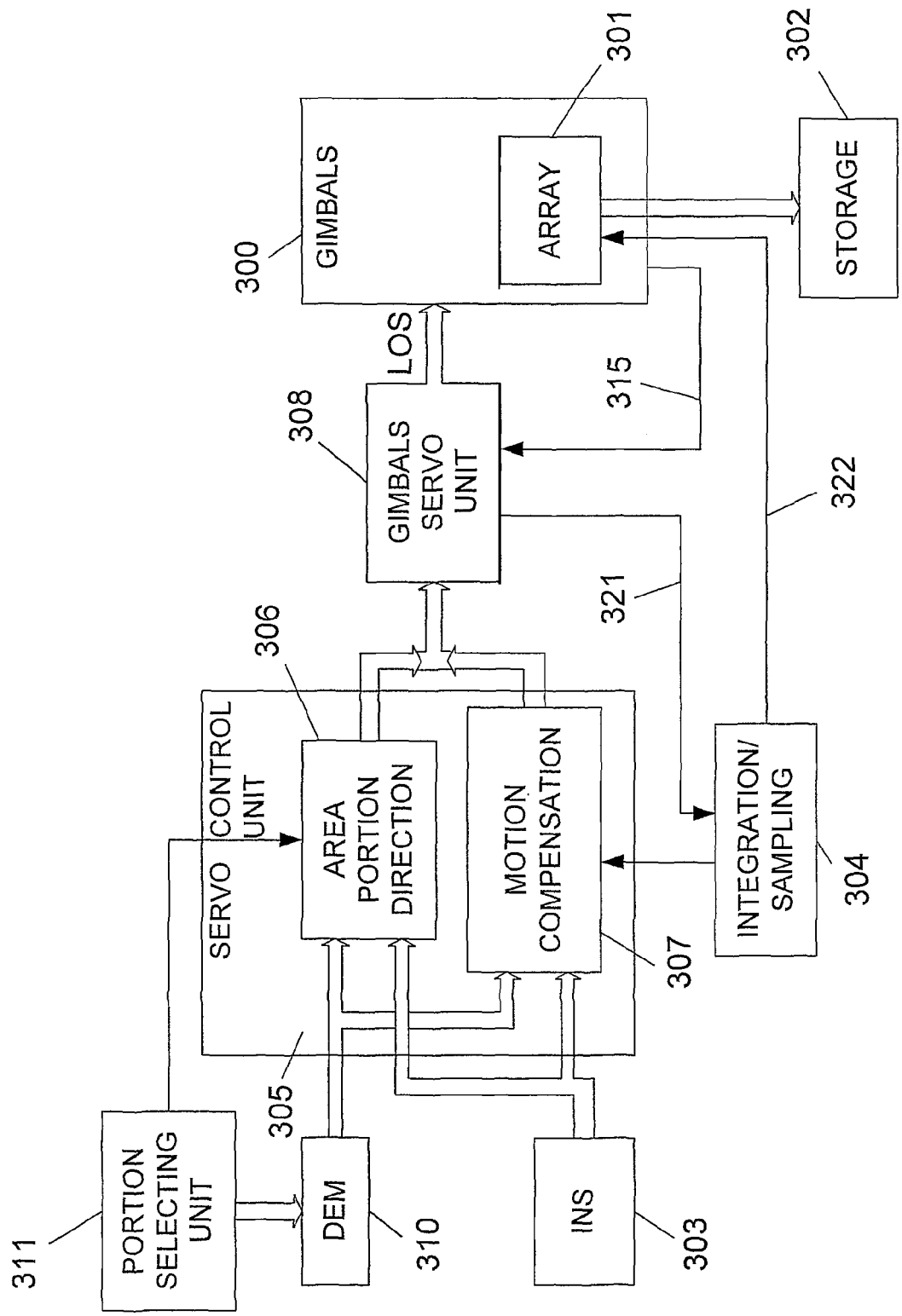
FIG. 4 is a block diagram illustrating the operation of the reconnaissance system of the invention.

FIG. 4 is a block diagram illustrating the operation of the reconnaissance system of the invention. As said, the operation of the system involves three main phases. At the first phase, the line of sight of the array is directed towards a selected area portion. At the second phase, the array is "exposed" to light coming from the area portion, and charge is integrated correspondingly within the array components. During said second phase, motion compensation is provided by moving the line of sight with the gimbals, in order to compensate for the aircraft motion and change of orientation during the exposure (integration) period, particularly in order to eliminate smearing. At the end of the integration period, at the third phase, all the array light-sensitive sensors are simultaneously sampled, and the image is stored. Before takeoff, a Digital Elevation Map 310 of an area, which includes within it at least the area of interest, is stored at the reconnaissance system. The Digital Elevation Map 310 is a digital file reflecting a map divided into a grid, wherein for each nodal point of the grid, the x-y coordinates (with respect to a global or predefined coordinates system) and the elevation z at that point are provided. The portion selection block 311 selects an area portion. More particularly, the portion selection block 311 sequentially indicates a nodal point being a center of a selected area portion within the DEM 310, causing the DEM 310 to convey the coordinates of the center of the area portion to the servo control unit 305. The concept of finding the 3D center coordinates of a selected target using a DEM, as described in the present invention, can also be used in systems other than reconnaissance systems, such as targeting systems, where sometimes it is desired to measure the exact range to the scene or a selected target without employing active range finders. Preferably, and as will be elaborated later, several selection modes exist for selecting an area portion, and determining its borders, or more particularly, determining its central nodal point. The $x_p$:$y_p$ coordinates of the center point of the selected area portion, and the elevation coordinate $z_p$ of the same point are conveyed to the servo control unit 305. The area portion direction module 306 of the servo control unit also periodically receives from the INS 303 the $x_a$:$y_a$:$z_a$ coordinates of the center of the on-gimbals array. Having these two sets of x-y-z coordinates, the area portion direction module 306 geometrically calculates the gimbal angles required for establishing a Line Of Sight (LOS) between the center of the array ($x_a$:$y_a$:$z_a$) and the center of the selected area portion ($x_p$:$y_p$:$z_p$) and converts said angles to the analog signals required by the gimbals servo unit 308 for establishing said direction of the gimbals 300. The said direction calculation is repeated and updated in short time intervals, in order to account for the change in the aircraft location and orientation. The gimbals servo unit 308 receives a signal 315 from the gimbals unit indicating the state of the gimbals with respect to the desired LOS direction. When it determines that the LOS direction has been established, the servo unit conveys a signal 321 to the Integration/Sampling unit 304, for initiating the integration period. The Integration/Sampling unit 304 provides a signal 322 to the array 301, causing it to begin light integration of incoming light from the area portion. From that instance, the light sensitive components of the array begin to accumulate charge relative to the level of light at each corresponding section of the area portion.

During the integration period, motion compensation is repeatedly calculated by the motion compensation module 307. The motion compensation module 307, in similarity to the area portion direction module 306, also receives from the DEM the ($x_p$:$y_p$:$z_p$) coordinates of the center of the selected area portion and from the INS the ($x_a$:$y_a$:$z_a$) of the center of the on-gimbals array 301. The motion compensation module 307 repeatedly calculates the gimbal angles required for establishing a Line of Sight (LOS) between the updated coordinates of the center of the array ($x_a$:$y_a$:$z_a$) as received from the INS, and the center of the selected area portion ($x_p$:$y_p$:$z_p$) and accordingly converts said calculated angles to analog signals required by the gimbals servo unit 308 for establishing said direction (i.e., said angles) of the gimbals 300, or in other words, to repeatedly compensate for the motion and change of orientation of the aircraft during the integration period. Motion compensation for image roll around the LOS may also be done, by using an additional de-roll gimbals, but this is typically not needed in small or medium-sized arrays due to the small smearing effect of roll in such arrays. At the end of the integration period a "sampling" signal 322 is provided to the array 301, for simultaneously sampling the accumulated charge levels within all the array sensors, and storing in storage 302 the said charge levels as an image of the selected area portion. The image storage 302 is essentially the SSR 3 of FIG. 1. Next, the portion selection block 311 selects a center of a next area portion from the DEM 310, and conveys the same to the area portion direction module 306, and the same procedure as described above repeats for this next area portion. The procedure repeats for all the area portions of the area of interest. It should be noted herein that there are several optional modes by which the portion selection block 311 operates. In one optional case, the portion selection block 311 first selects a center of a first area portion and obtains its image, and then, for any additional portion it determines in real time the center of a next area portion which satisfies, for example, a requirement of 10% overlap between the present portion and the previously imaged portion. This optional case will be described in more detail hereinafter. In another mode of portion selection, the pilot marks the center of a portion, and the image of that portion is accordingly obtained after carrying out the above procedure of direction, motion compensation, integration and sampling. In still another optional selection mode, all portions of the area of interest and their center are predefined, for example while the airplane is on the ground, and the selection is then carried out according to said predefined order, while during the flight the exact directions are updated automatically based on the actual position and attitude of the aircraft.

Figure 11A:
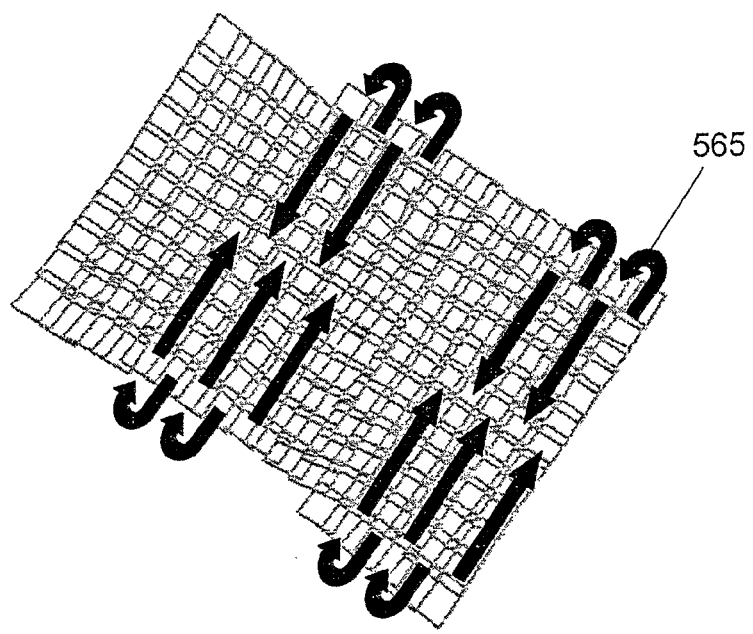
FIG. 11A shows an upper view of the terrain of FIG. 11, and the manner of scanning of the said terrain by the airborne reconnaissance system of the present invention.

The selection of an area portion, so that a pre-defined overlap will exist between successive images, is dependent on the overall geometric scenario including aircraft position with respect to the scene and the ground variations of the captured scene. Referring to FIGS. 11 and 11A, for each snapshot, the footprint of the sensor's FOV on the ground is calculated using the 3-dimensional ground data of the DEM. Each footprint is a 3-dimensional plane, or a higher order surface, tilted in two directions in order to best fit the ground's gradients. After taking a snapshot, and before taking the next snapshot, the system estimates the direction of the LOS center using extrapolation from the previous snapshots or other techniques, and calculates the estimated ground footprint of the next snapshot. The overlap between this estimated footprint and the footprint of the previous snapshot is calculated by projecting the former on the latter, and then the direction of the LOS center is modified in order to ensure an overlap within a specified range of values. This process repeats iteratively a few times until the required overlap is achieved, and then the LOS is physically moved to the location of the new snapshot. The calculation may also be done analytically without iteration, depending on the mathematical model and the computing resources available to the reconnaissance system. The number of jumps of the LOS across track (i.e. along a row), which determines the width of the photographed strip, is continuously calculated to ensure maximum strip width without creating an excessive lag in jumping along track to the next row to compensate for the aircraft progression.

Gimbals having at least two degrees of freedom are well known in the art, and are used, for example, in some aircrafts for inertial directing and tracking the targeting system to a target, a targeting system being a system enabling observation of targets and directing weapon systems towards them. Some of said targeting systems also use navigational and orientation data from an Inertial Navigation System for calibrating the tracking in real time. The present invention uses a gimbals system similar to the one used in said airborne targeting systems. The "tracking" of the gimbals with the array to the relevant area portions, each portion in its turn, is performed in a similar manner as some airborne targeting systems direct and track their weapons to a target. However, in such targeting systems the area of interest is not divided into a plurality of matrix-type portions, and there is no systematic scanning of the relevant area portions within an area of interest in a sequential step-wise manner. Moreover, in the targeting systems, the problem of motion compensation is solved by other means, such as electro-optical tracking based on image information, a solution that is not practical for area scanning systems, such as the reconnaissance system of the invention. As said, the problem of motion compensation is implemented in a completely different manner in some of the prior art reconnaissance systems, for example an on-chip motion compensation is disclosed in U.S. Pat. No. 5,155,597, U.S. Pat. No. 5,692,062, and WO 97/42659. The invention uses a combination of the INS and gimbals system having at least two degrees of freedom for (a) carrying out area scanning by which a "jump" between area portions is performed in a coarse manner, and (b) motion compensation during the integration period of an area portion which is performed in a fine manner. The facts that the elevation (i.e. altitude) at the center of each selected portion, as obtained from the DEM, and that the gimbals system has at least two degrees of freedom, enables full and fine motion compensation in all axes. This structure, as will be elaborated later, enables the aircraft to carry out sharp maneuvers in a superior manner in comparison to reconnaissance systems of the prior art. Furthermore, it has been found by the inventors that due to the longer sensors' exposure time to light (i.e., longer integration time) which becomes possible in the system of the invention due to the use of staring arrays, there is essentially no need for a TDI structure in which a same area pixel is scanned N times, and then averaged. The system instead can use a single "snapshot" capturing of each area portion.

Figure 5:
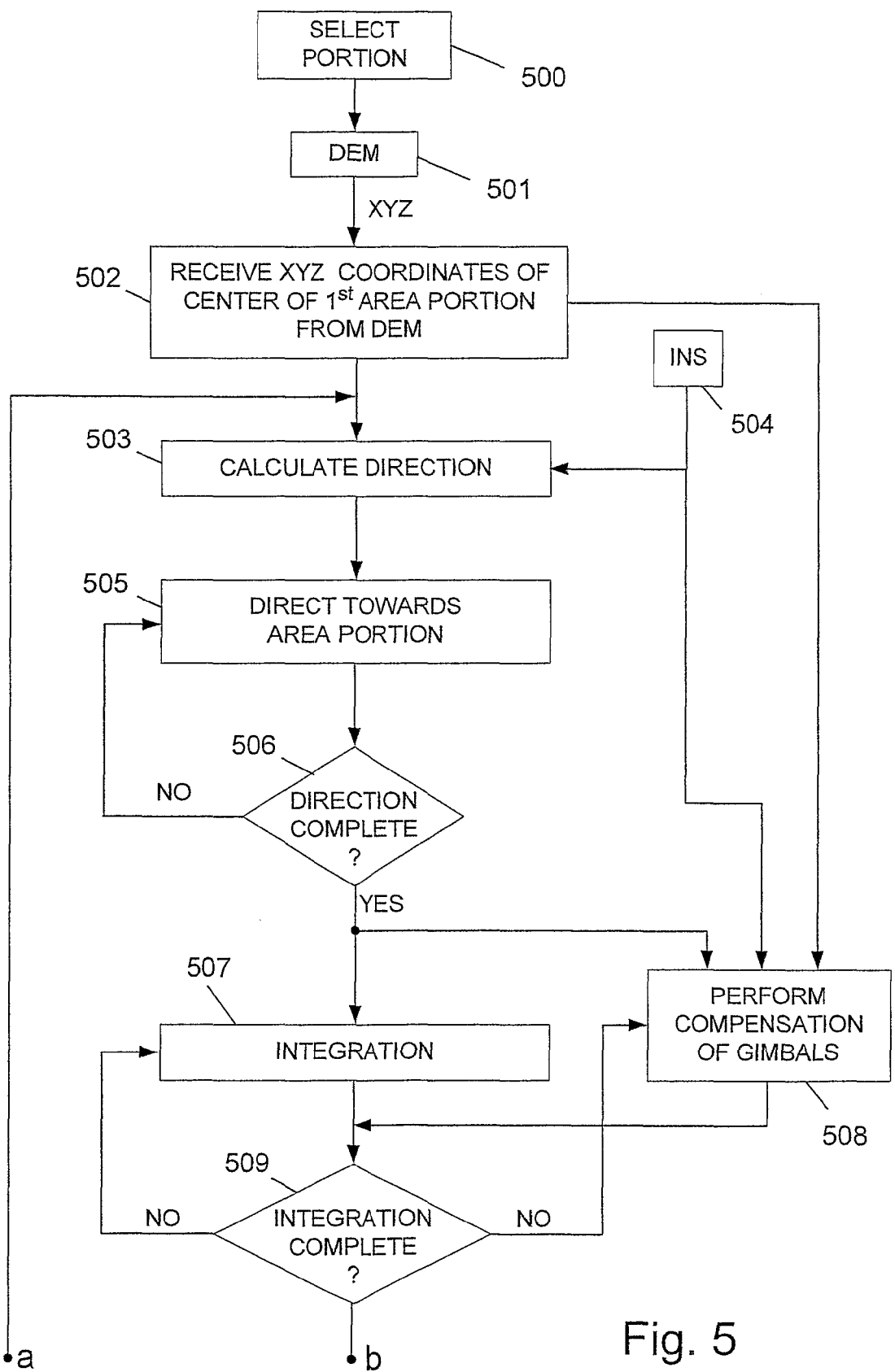
FIG. 5 is a flow diagram describing the operation principles of the reconnaissance system of the invention.
Figure 5:
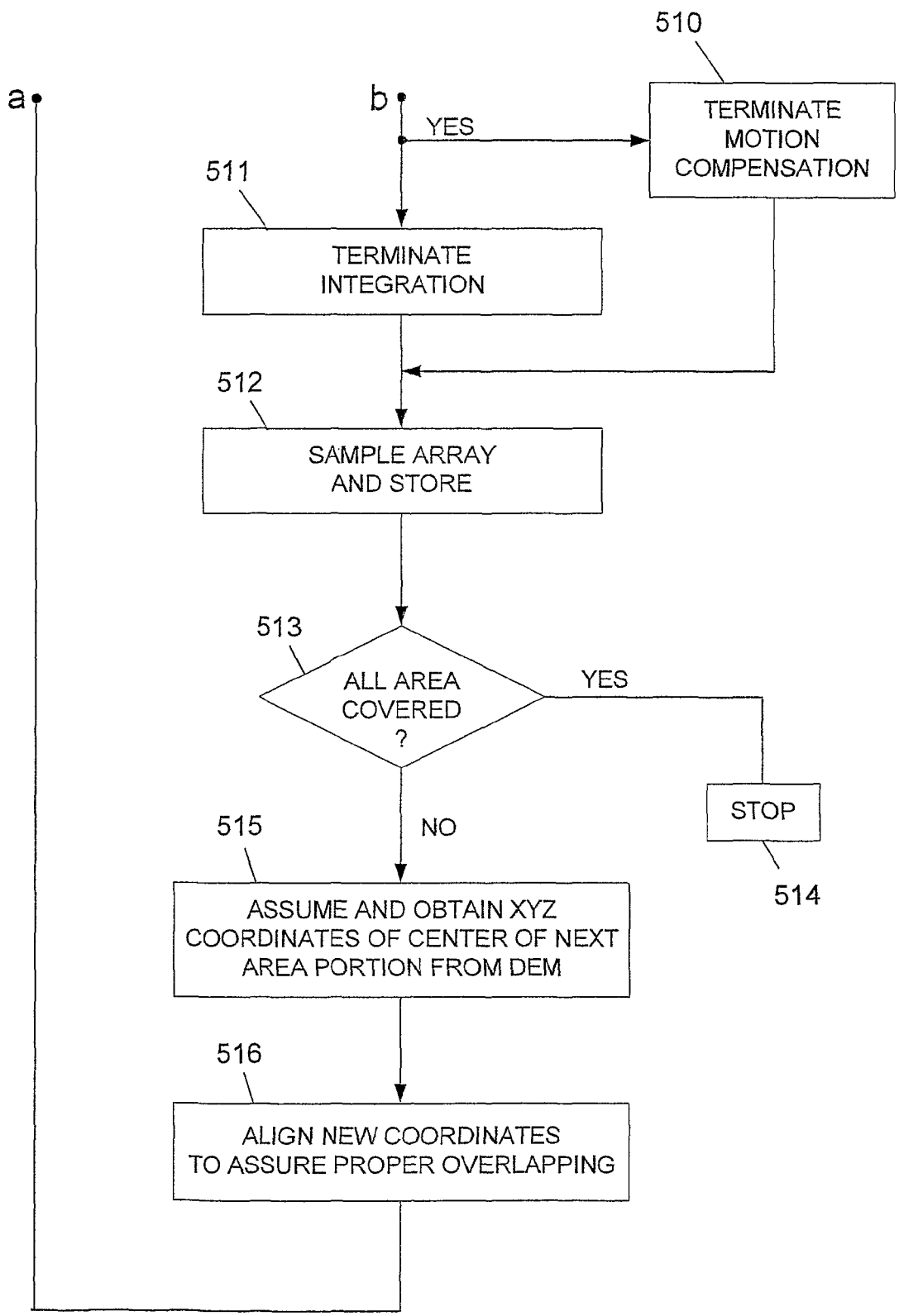

FIG. 5 is a flow diagram describing the operation principles of the reconnaissance system of the invention. The flow diagram of FIG. 5 assumes that an area of interest has been defined, more particularly, the borders of the area of interest. In a preferable embodiment of the invention, the center of the first portion of the area of interest to be imaged is determined automatically. For example, if the area of interest is viewed as a matrix, the first portion may be the farthest, leftmost portion, and its center is selected automatically by means of some predefined manner. Next, the centers of all the other area portions are determined in real time, in order to satisfy some predefined range of overlap between the images, as explained before. The definition of that range is necessary in order, on the one hand, to assure that no "holes" of imaging exist, and on the other hand, that no extreme overlapping exists between images of adjacent portions, involving more images than necessary. As will be elaborated hereinafter, this procedure involves using the DEM 310.

In block 500, the center coordinates $x_1;y_1$ of the first selected portion is provided to the DEM 501, which in turn conveys the set $x_1:y_1:z_1$ ($z_1$ being the elevation at $x_1;y_1$) to the servo control unit 305. The Servo control unit 305, which also receives the real time present coordinates of the center of the array $x_a:y_a:z_a$ from the INS (step 504), also calculates in step 503 the angles and signals required to establish a line of sight between the center of the array and the center of the said first area portion $x_1:y_1:z_1$. The signals are conveyed to the gimbals servo unit, which establishes the desired LOS direction in step 505. In step 506, a check is made to determine whether the establishment of the proper direction has been completed. Of course, this is a dynamic operation which is repeated in a very frequent and rapid manner to perform correction according to the airplane progression, and any change of orientation, for example due to elasticity or aircraft maneuvering, as being reported by the INS 504, which in a preferable case has its inertial sensors on the gimbals. In step 507, the light integration by the array components takes place. Simultaneously, during the integration period a motion compensation takes place, again, to account for the aircraft progression and any change of its (or more particularly of the gimbals array) orientation. This operation is also performed repeatedly, in real time, with high frequency, typically around 100 Hz, that guaranties highly accurate motion compensation during the time of integration. At step 509, a check is made to determine whether the integration period has lapsed. At the end of the integration period, the light integration by the array terminates (step 511) and the motion compensation of step 508 may also terminate (step 510). At step 512, all the array sensors are sampled at the same time (in a snap-shot manner), and the image is stored. At step 513, a check is made whether all the area of interest has been covered by the images already taken. In the affirmative case, the procedure terminates (step 514). If, however, the full area of interest has not been covered yet, the application assumes x:y coordinates of a next area portion (step 515), which are conveyed to the DEM to obtain the elevation z at the same portion center. The next area portion may either be located across-track (same row) or along track (new row) from the previous area portion, depending on the calculated row width so that a maximum strip width is achieved while not lagging behind the aircraft progression. Next, in a preferable case (step 516) a simulation is made to determine whether, if an image is taken when directing to said x:y:z coordinates, the overlapping area between the area of the previous image and the area of the said new image satisfies a predefined overlap range (for example between 10%-20% overlap). If the overlap is found to be too great, this center point is then positioned slightly farther from the center of the previous portion. If, however, the overlap is found to be too low, the portion center is positioned slightly closer to the center of the previous portion. This simulation uses the DEM, which is essentially a digital map which also includes elevation at all the grid nodal points. The use of the DEM for that purpose is advantageous, as the elevation is of high importance when checking the overlapping issue. It has been found that after one or two repeated simulations, a new portion center can be determined. The alignment of step 516 as described is preferable, but not essential. From step 516 the procedure continues to step 503 using the new x:y:z coordinates of the portion center as determined at step 516, and the procedure is repeated until coverage of all the portions of the area of interest is completed. Then, the system may switch to scan a new area of interest if such is desired. It should be noted that although it is preferable to scan an area of interest in a sequential order, as it simplifies the portions overlapping calculations and improves the scanning efficiency, the scanning may also be performed in any other, predefined (or not) order.

As said, when directing the array to the center of an area portion, and compensating for the aircraft motion and the orientation change, the elevation of the relevant area portion is of particular importance for obtaining high accuracy. Therefore, according to a preferred embodiment of the invention, a Digital Elevation Map (DEM), i.e., 3-D map which includes a grid of the area of interest, is used. Generally, there is no problem in obtaining such Digital Elevation Maps of almost any area in the world; such information is commercially available, or can be extracted from a topographic map of the area. The DEM of the area of interest is loaded into the airborne system before the reconnaissance mission, generally to the SSR 3.

Figure 9:
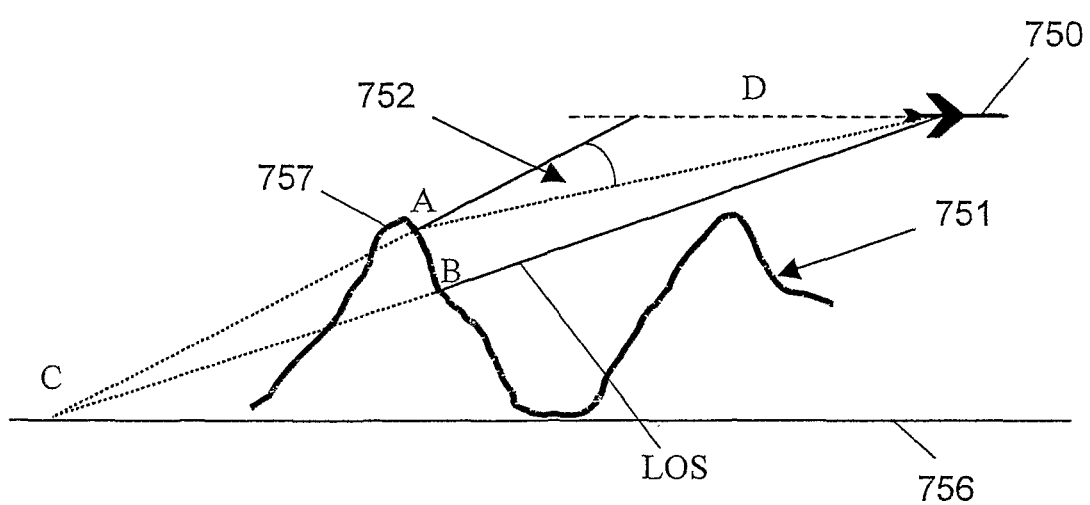
FIG. 9 exemplifies the significance of the elevation factor when carrying out a reconnaissance mission, and more particularly shows the importance of considering directly and in real-time the elevation of the imaged terrain.

As said, the reconnaissance systems of the prior art, for example, as disclosed in U.S. Pat. No. 5,155,597, U.S. Pat. No. 5,668,593, U.S. Pat. No. 5,692,062, WO 97/42659, U.S. Pat. No. 6,130,705, and U.S. Pat. No. 6,256,057, do not directly consider the elevation of the terrain at the imaging area portion while calculating the Forward Motion Compensation (FMC), or Motion Compensation (MC) in general. Some of those systems, for example, as disclosed in U.S. Pat. No. 5,692,062, U.S. Pat. No. 6,130,705, use image-to-image correlation in order to indirectly estimate the smearing effects of the terrain variations and correct them using on-chip techniques, but these techniques have drawbacks as described before, and therefore are not considered in the following discussion. These drawbacks include the need for three successive image captures for each usable image, limited correlation accuracy due to smearing of the first two images, large pixel-shift between successive images, and varying V/R during the 3-image capture process. FIG. 9 exemplifies the significance of the elevation (i.e. altitude) factor, and shows how important it is to consider directly and in real-time the elevation of the imaged terrain. Generally, in prior art reconnaissance systems, the aircraft INS, when used, computes the aircraft position and attitude with respect to a global system, but has no knowledge whatsoever of the actual shape of the terrain 751 being photographed. The aircraft 750 therefore assumes some fixed, ground level 756, generally sea level, as depicted. Now, if the reconnaissance system photographs the area whose center point is A, during the exposure time, the aircraft 750 progresses a distance D. The reconnaissance LOS (Line of Sight) will keep pointing at point C assuming a fixed level 756, thus shifting point A to point B during the exposure time, and for the mountain 757, a smear of magnitude AB, or error angle 752 is created.

Example 1

The following is a numeric example for assessing the pixels smear in the prior art systems when capturing a terrain with large variations, showing a forward oblique scenario: Aircraft flying at a velocity of 250 m/s, range from the aircraft to scene of 10 km to level ground, exposure time of 10 ms, and assuming mountain 757 is at ½ range (i.e. 5 km), and altitude of aircraft is 5 km.

Therefore, the angular velocity of the LOS is approximately 12.5 milirad/s (aircraftVelocity/aircraftAltitude)×$SIN^2$(LOSdepressionAngle), and the angular travel of the aircraft during integration time is 12.5×0.01=125 microrad. The angle 752 is therefore 125 microrad; for a typical pixel Instantaneous FOV (IFOV) of 30 microrad this means a smear of more than 4 pixels.

The situation is even worse for a side oblique scenario, where, in this example, the angular velocity is 250/10,000=25 milirad/s, and the resulting smear is 8 pixels.

For the system of the invention, the pixel smear is much smaller, as demonstrated in the following example. The error in the LOS angular velocity due to range R and velocity V uncertainties is calculated by the following formula:

$$\omega = \frac{V}{R} \Rightarrow \Delta\omega = \frac{V_{nom}}{R_{nom}} \cdot \sqrt{\left(\frac{\Delta V}{V_{nom}}\right)^2 + \left(\frac{\Delta R}{R_{nom}}\right)^2}$$

For $V_{nom}$ of 200 m/s, $R_{nom}$ of 15 km, LOS depression angle of 20 degrees, terrain slope up to 15%, a typical INS velocity error of 0.045 m/s, a typical LOS angular error of 2 mrad, a typical aircraft position error of 30 m, a typical aircraft altitude error of 42 m, and a typical DEM altitude error of 15 m, we calculate (all values 3σ) the range error as 160 m, and the LOS angular velocity error:

$$\omega = \frac{V}{R} \Rightarrow \Delta\omega = \frac{200}{15000} \cdot \sqrt{\left(\frac{0.045}{200}\right)^2 + \left(\frac{160}{15000}\right)^2} \cong 0.14 \text{ [mrad/sec]}$$

The pixel smear during the integration time of 10 ms will then be 0.14×0.01=1.4 microrad, which, for a typical IFOV of 30 microrad is a small sub-pixel smear, i.e., a smear of less than 5% of a pixel.

Various types of scanning may be used in the system of the invention, as follows:
a. Sequential matrix scanning: The portions of the area of interest are captured according to their sequential order within the area matrix.
b. Selective scanning: Any selection can be predefined, and the portion capturing is performed accordingly.
c. Manual capturing: the capturing of an area portion is carried out manually, according to the pilot selection.

Figure 7:
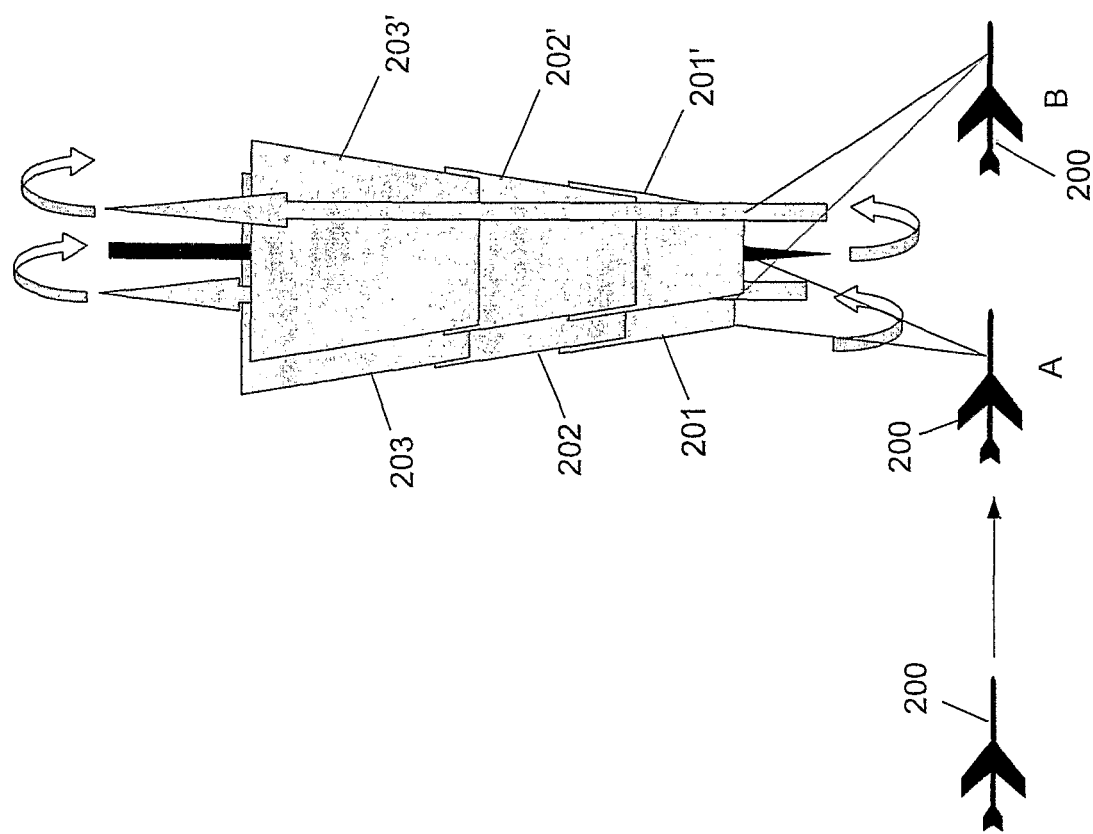
FIG. 7 shows how a stereoscopic image is constructed by the system of the present invention.

It should be further noted that a stereoscopic imaging could also be obtained by the system of the invention. Unlike systems of the prior art, especially those disclosed in U.S. Pat. No. 5,155,597, U.S. Pat. No. 5,692,062, and U.S. Pat. No. 6,256,057, the system of the present invention can enhance the stereoscopic effect by "revisiting" an area portion after the aircraft progressed to a substantial angular displacement with respect to the area portion. FIG. 7 shows how a stereoscopic image can be constructed by the present invention. As is known in the art, a stereoscopic image of an area or object can be constructed by using two images, each covering a substantial overlapping portion of the area or object, if said two images are taken from two points of views angularly remote enough one from the other with respect to the imaged area. In FIG. 7, the reconnaissance aircraft 200 flies from the left to the right, in the route as shown. When passing, for example point A, the aircraft sequentially captures the portion images 201, 202, and 203, by directing the on-gimbals array to these portions accordingly. Thereafter, the aircraft continues to point B, at which the gimbals are directed again to capture correspondingly the images 201', 202', and 203' of the same area portions; however, now, from the point of view of B. If a substantial portion, for example, about 56%, of each area portion overlaps in the images as taken from points A and B respectively, a stereoscopic image of the area portion can be constructed in a known manner. As shown, the invention provides an easy, simple, and compact manner for obtaining the images required for constructing stereoscopic images. When interpreting reconnaissance photos, the stereoscopic effect may be obtained, for example, by displaying the two images of the same area portion at different light polarities, and then viewing the display using polarizing glasses, directing one image to the left eye and the other to the right eye.

Figure 6:
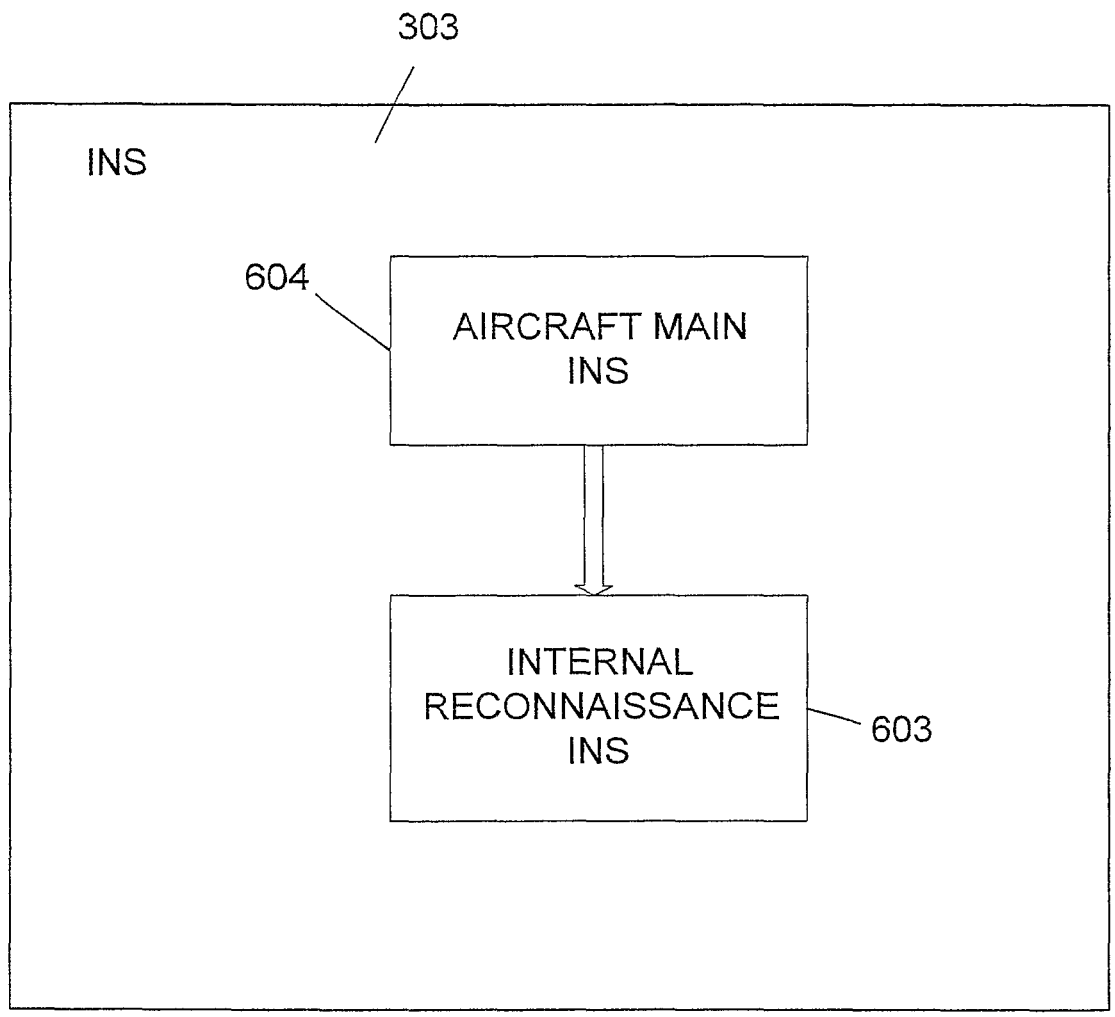
FIG. 6 shows the structure of the INS system of the invention, which comprises the main INS of the aircraft, and the dedicated INS of the reconnaissance system of the invention.

In a more preferred embodiment of the invention, two Inertial Navigation Systems are used by the reconnaissance system of the invention. More particularly, and as is shown in FIG. 6, the INS 303 of FIG. 4 comprises two separate Inertial Navigation Systems. The first INS is the aircraft main INS 604, usually combined with GPS, and the second INS is the Internal Reconnaissance INS 603. As said, the INS 303 is used for providing navigational data, such as the present coordinates of the aircraft with respect to a predefined, preferably global coordinates system, and orientation data relating to the orientation of the aircraft with respect to said global coordinates system. This data has to be very accurate, and has to be continuously updated in order to assure accurate direction to the captured area, and not less important, in order to assure accurate motion compensation, even during fast and sharp maneuvers of the aircraft. This task involves even more complication, as due to the elasticity of the aircraft the portions suffer from very high accelerations, and very intense airflow. Therefore, in order to best direct the array of light-sensitive sensors, and to best compensate for the aircraft motion, it has been found by the inventors that it is essential to position an INS inside the reconnaissance system, and preferably on the gimbals themselves, for measuring navigation and orientation data of the gimbals, with respect to a predefined global coordinates system. Therefore, the Internal Reconnaissance INS is preferably positioned on the gimbals, proximate to the array that is preferably positioned on the gimbals as well, and accurately measures said data. However, as the Internal INS must be limited in size, and therefore may suffer from some inaccuracies and drifts, according to the present invention the Internal INS 603 is connected to the Aircraft Main INS 604. The main aircraft INS periodically updates the internal INS with navigational data for aligning it for possible drifts, using the prior art transfer alignment process described before. In such a manner wider bandwidth and higher accuracy of the gimbals servo is obtained. Typical values for mechanical misalignment between the aircraft and the reconnaissance system LOS are 10-20 mrad, while the aligned on-gimbals INS can measure this misalignment to an accuracy of 1-2 mrad.

It should be noted that the area portions are typically captured by the system of the invention in a "snapshot" manner, typically with much longer integration time than the vector or array in systems of the prior art. While the typical integration period in the system of the invention is in the order of milliseconds, in systems of the prior art using vectors, such as, U.S. Pat. No. 5,155,597, U.S. Pat. No. 5,692,062, and U.S. Pat. No. 6,256,057, the typical integration periods are two to three orders of magnitude shorter (i.e., between 100 to 1000 times shorter), resulting in a much lower photonic sensitivity to light. This evolves from the fact that the invention uses an array having several hundreds or thousands of rows and columns, in which each pixel is exposed to light during all the area-capturing time. In the prior art systems using a one-dimension vector, a same capturing period is divided between the pixels of a same vector, which must be exposed hundreds or thousands of times in order to cover a same area portion. Moreover, the fact that the system of the invention allows great flexibility in selecting areas and portions within areas of interest enables a significant reduction in the amount of data that the system has to deal with (i.e., to capture, store, and/or transfer by communications means). More particularly, images of only portions and areas of interest are captured by the system of the invention.

Example 2

Figure 12:
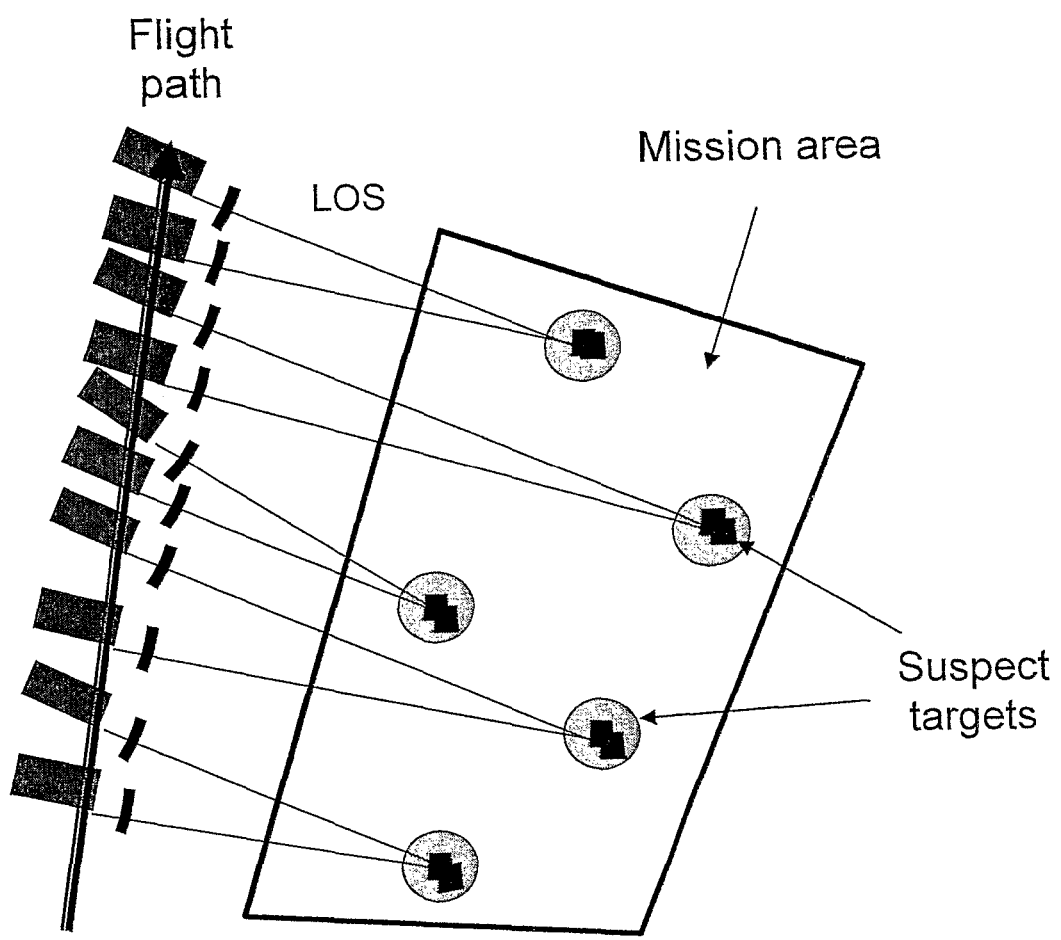
FIG. 12 is an example illustrating how the system of the present invention can photograph selective targets, thereby significantly reducing the amount of data handled.

The following is an example showing the saving in the amount of data which the system of the invention handles (i.e., storing, transmitting to a ground station, etc.), in comparison with a pushbroom or a large-sized array reconnaissance system:

Mission duration: 2 hours;

FIG. 12 illustrates this scenario. Area of high priority targets with respect to the photographed area: 40% for snap shooting. The term "snapshot", refers herein to a manner in which all the array pixels are simultaneously exposed to light from an area portion, and data from all the array pixels simultaneously is read at the end of the said exposure; 5% for pushbroom or large-sized array—due to the efficiency of LOS and FOR mission planning (this is an assumption resulting from the ability of the system of the invention to better select high priority targets within an area of interest, and to ignore area portions of no interest);

Sensors' data throughput rate uncompressed: 20 Mbytes/s

Low compression rate: 1:5

High compression rate: 1:10

Overlap area for snapshots reconnaissance (according to the invention): 40% total of along-track and across-track overlap;

Overlap area for pushbroom: 20%;

Total Recording:

$$\text{Snapshooting} = (2 \text{ hr} \times 60 \times 60) \times 20 \text{ MB/s} \times (0.4/5 + 0.6/10) \times 1.4 = 28 \text{ GB} \qquad 1.$$

$$\text{Pushbroom} = (2 \text{ hr} \times 60 \times 60) \times 20 \text{ MB/s} \times (0.05/5 + 0.95/10) \times 1.2 = 18 \text{ GB} \qquad 2.$$

As said, the number of high priority targets obtained for snap-shooting reconnaissance (according to the invention) is 40%/5%=8 times higher than for push-broom or large-sized array reconnaissance, and therefore the overall efficiency of the mission is: 8×(18/28)=5.1 in favor of snapshooting according to the system of the invention.

This is a significant increase in efficiency.

It should be noted herein that the reconnaissance system of the invention, by directing the LOS of the array/s of light sensitive sensors using gimbals with at least two degrees of freedom, enables the defining of an area of interest of arbitrary shape which is divided, preferably in real time, to a plurality of area portions that are sequentially scanned in a stepwise systematic and accurate manner to obtain images of those portions until covering the full area. The system of the invention enables not only efficient covering of a specific area of interest, it also eliminates the need for providing dedicated means for forward motion compensation, as required in reconnaissance systems of the prior art, for example in U.S. Pat. No. 5,155,597, U.S. Pat. No. 5,668,593, U.S. Pat. No. 5,692,062, WO 97/42659, U.S. Pat. No. 6,130,705, and U.S. Pat. No. 6,256,057. By directing the LOS of the array using gimbals with at least two degrees of freedom, and by continuously correcting the direction to the selected area portion during the "exposure", not only forward motion compensation with respect to the forward axis is provided, but also consideration is made to the 3D shape of the terrain for providing improved motion and orientation compensation with respect to all three axes. This fact is of particular importance, as it enables sharp and wide maneuverings of the aircraft. Moreover, no matter where the aircraft is positioned with respect to the area of interest or to any portion within said area, and no matter in what orientation, the system provides means for obtaining appropriate images of such area portions (assuming no obstruction from the aircraft body).

Example 3

The invention was successfully implemented with the following parameters:

Airborne pod configuration;

Number of pixels: Visual array: 2000×2000, IR array 640×480;

Integration times: 1-15 ms;

Operational ranges: up to 30 km and altitude up to 10 km;

Snapshot rate: 3 per second, both sensors arrays operating simultaneously.

FOR: full spherical coverage, excluding a ±30 degrees backward looking cone;

See also FIGS. 11 and 11A that are the result of an actual simulation of the scanning and overlapping process.

As said, in the embodiment of the invention as described above, the area scanning operation is performed by the gimbals that first direct the center of the array's LOS to the center of the relevant area portion, then, an exposure of the array to the light coming from the area portion occurs (i.e., the array starts integration of light from the area portion), and at the end of the exposure period the image of the area portion is captured. Next, the array's LOS is directed to the center of a next area portion, and the procedure of integration and capturing repeats. This procedure repeats for all the area portions of the area of interest. More specifically, in the above embodiment the gimbals operate during the scanning of the area of interest in a "jumping" manner, by which the gimbals first move until an alignment to the predefined area portion is obtained, then the gimbals are stationary during the exposure period (except for motion compensation movement), and next the gimbals move again to direct the array to the center of the next area portion, etc. This type of operation is limited in the number of snapshots per second as demonstrated in Example 3, as the acceleration-deceleration and stopping of the relatively heavy gimbals is time-consuming.

According to still another embodiment of the invention, the scanning efficiency is improved by using a back-scanning mechanism, as is shown in FIG. 9. As said, in the "jumping"-type scanning, the array and its associated optics is preferably positioned on the internal gimbals, and all these are stationary with respect to said internal gimbals. In the improved, back-scanning embodiment of the invention a back-scanning array assembly 860 is mounted on the internal gimbals. The assembly essentially comprises lenses 861, and 862, stationary mirror 864, and a low-mass single or dual-axis back-scanning rotating mirror or prism 863. The back-scanning rotating mirror is mounted on a dedicated motor. In the back-scanning method, the scanning of the area portions is performed continuously, or, in other words, the gimbals continuously scan columns (or rows) of the area of interest at high LOS angular velocity, and this scanning movement comes on top of the direction alignment and motion compensation, as described above.

Figure 10:
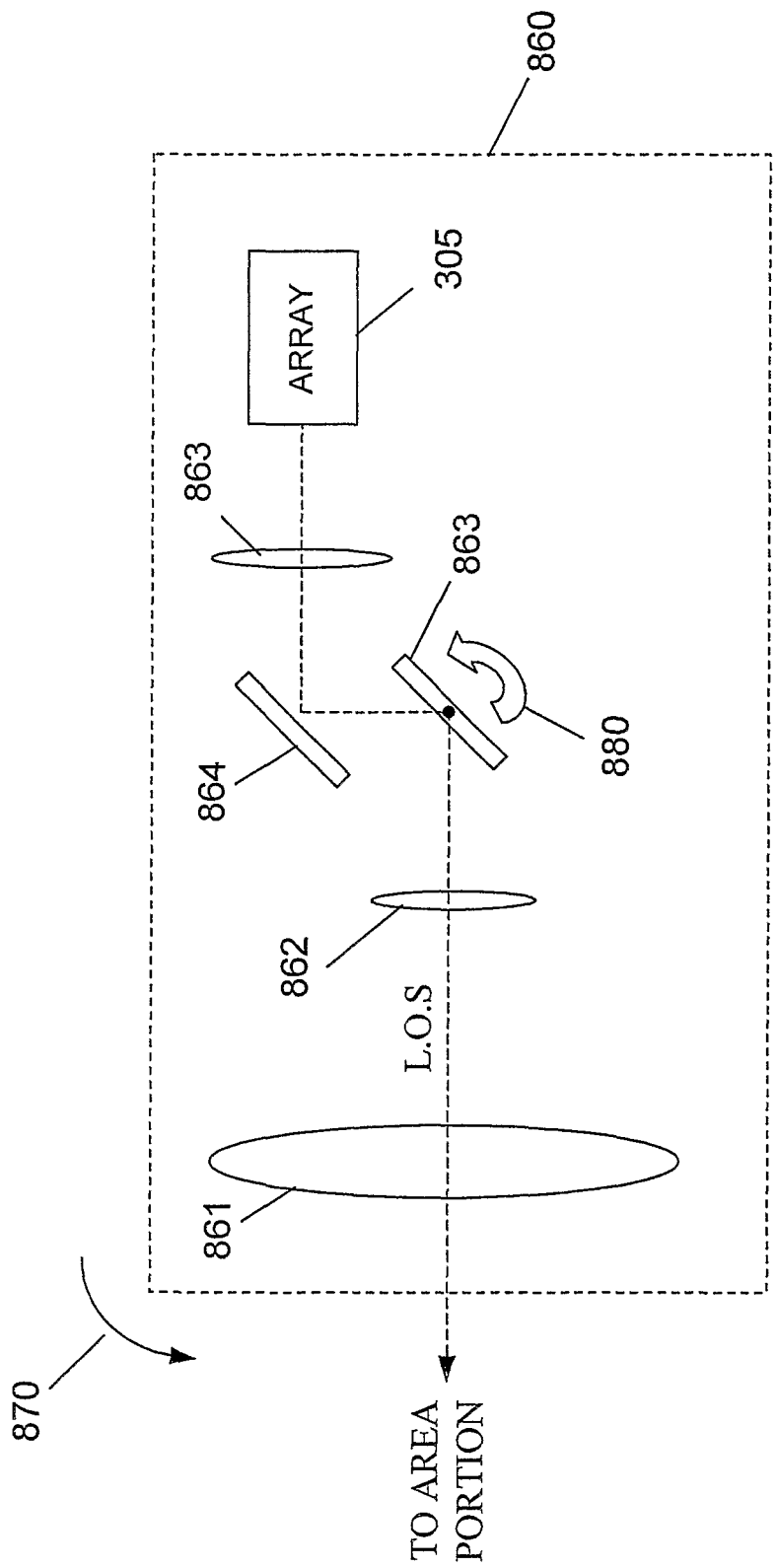
FIG. 10 illustrates the use of a back-scanning mirror in accordance with the system of the present invention.

Whenever an exact alignment to the center of an area portion is obtained, the light integration (exposure of the array) period begins, and the back-scanning mirror 863 compensates for the scanning continuous movement of the gimbals, only during the integration period by maintaining angular movement to the opposite direction in half the angular velocity. With reference to FIG. 10, if the gimbals maintain a scanning constant angular inertial velocity in the direction 870, the back-scanning mirror 863 rotates during the integration period (only) in the opposite direction 880, in half the angular velocity. In this manner, the area portion is maintained stationary at the array 305. At the end of the integration (exposure) period, the mirror 863 returns to its initial position, until a new integration period, in which the same constant movement of the mirror repeats. The back-scanning enables the gimbals to move at higher velocity without having to stop for each snapshot. Stopping the gimbals consumes most of the duty cycle time due to the high acceleration/deceleration and to the high inertial mass of the gimbals and their payload (i.e. the sensors). The back-scanning mirror can move much faster thanks to its much smaller inertial mass.

Example 4

The angular range of the back-scanning mirror is very small. For example, if the gimbals move at 60 deg/s and the exposure time is 10 ms, the angular displacement of the back-scanning mirror is 60×0.01=0.6 deg, which is very small.

A typical comparison: Using gimbals without back-scanning enables a snapshot rate of 3 frames per second in a typical installation (e.g. Example 3). The average gimbals velocity, for a Field of View of 3 degrees, would be approximately 3×3=9 deg/s. On the other hand, using back-scanning, the gimbals can move at a velocity of 60 deg/s, resulting in 60/3=20 snapshots/s, a rate which is more than 6 times higher. The maximum allowable rate is limited by the electronic frame rate of the sensor, which is typically 30 or 60 Hz, and therefore higher than 20 Hz.

Figure 8:
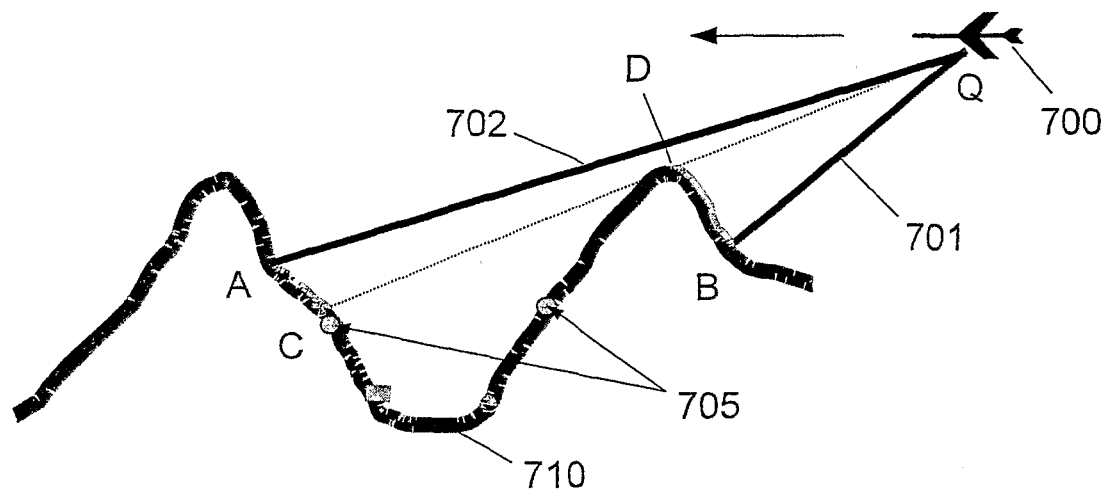
FIG. 8 illustrates a specific case in which a system of the prior art is required to carry out a reconnaissance mission.
Figure 8A:
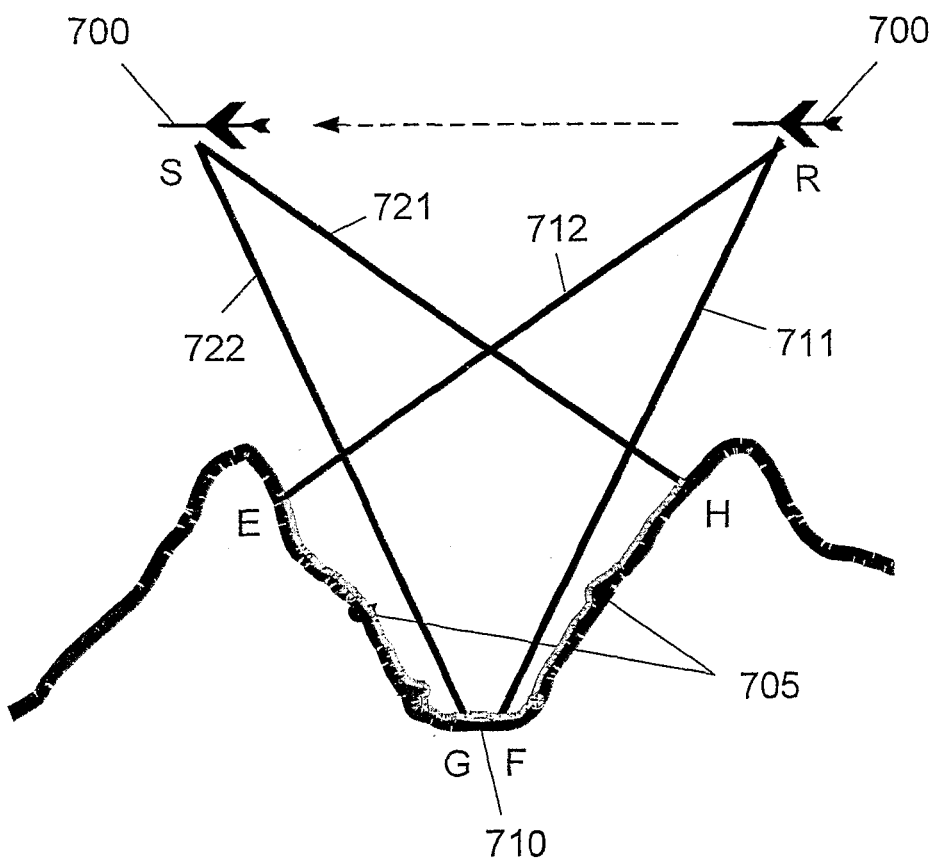
FIG. 8A illustrates how the system of the present invention carries out the same reconnaissance mission of FIG. 8A.

FIG. 8 and FIG. 8A illustrate a specific case in which the present invention is advantageous over prior art reconnaissance systems. Suppose that the aircraft 700 has a mission to obtain images of the two posts 705, and of a highway 710 located between the mountains. In a reconnaissance system of the prior art, in which the camera (i.e., the vector of light sensitive elements) is essentially fixed with limited FOR, the aircraft can cover from point Q (while having a field of view limited by lines 701 and 702) only the area between points B and D of the first (right) mountain and the area between points A and C of the second (left) mountain. Images of the two posts 705 and of the highway 710 are not obtained. In long range oblique photography (LOROP) the aircraft will fly towards the page, and the LOS will be side-oblique with substantial obscuration due to the small LOS depression angle. If the camera, however, is not fixed, as in the case of the prior art push-broom or whiskbroom systems, there is also no assurance of full coverage of the posts 705 and highway 710, as there is no synchronization between the movement of the field of view of the camera and the shape of the terrain. According to the present invention, this problem is easily solved. While preparing the mission and the division of the area of interest, it is possible to select any coordinate to be the center of an area of interest, and to program the reconnaissance system to direct its array/s' LOS to these selected coordinates from any predefined or manually selected location of the aircraft, so long as the LOS is within the system's FOR. Therefore, as shown in FIG. 8A, while being at location R the array's LOS may be forward directed to cover the area between points F and E, and later, while reaching point S, the array's LOS may be backward directed to cover the area between points G and H. In that case, the full area between the mountains, including the two posts 705 and the full image of the highway, can be obtained. The lines 711 and 712 indicate the limits of the field of regard of the reconnaissance system from point R, while the lines 721 and 722 indicate the limits of the field of regard of the reconnaissance system from point S.

FIG. 11 is a perspective view of a hilly terrain 560, and its division into area portions, including some overlap between area portions. Also shown in FIG. 11 is an instance in which one area portion is captured by aircraft 561, and a later instance in which another area portion, 564, is captured by the same aircraft. FIG. 11A shows an upper view of the same terrain, and the manner of scanning of the area of interest by the aircraft reconnaissance system, as indicated by the arrows 565.

To summarize, the present invention is characterized by the following main advantages over the prior art systems:

The ability to photograph in any LOS direction within a large Field of Regard (FOR). In order to have this ability (e.g., forward-oblique, side-oblique, down, and arbitrary looking) the prior art reconnaissance requires use of separate light-sensing units or a plurality of separate pods. This ability of the present invention enables the coverage of more targets (i.e., area portions) during a mission, with reduced storage requirements;

The ability to photograph in any aircraft flight direction within a large FOR;

The ability to focus on selective quality targets for a long duration and get many pictures at the highest quality while the aircraft is progressing. The overall mission area is not recorded, but only selective portions, thus saving storage;

The ability to photograph in terrain with large variations, by directing the LOS so that no obscuring will occur;

The ability to photograph while the aircraft is maneuvering, thus increasing mission flexibility and aircraft survivability;

The ability to operate manually or automatically in the same mission.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A portion selection unit in an airborne reconnaissance system for selecting one at a time another set of terrain coordinates of an individual area portion within an area of interest, each of said set of coordinates is in turn used by the system for directing a line of sight towards said area portion, and acquiring an image of it, said selections by the portion selection unit are repeated until acquiring images of all area portions within the entire area of interest.

2. A portion selection unit according to claim 1, wherein the order of the selected area portions is predefined.

3. A portion selection unit according to claim 1, wherein the portion selection unit determines the order of the selected area portions in real-time during scanning of the area of interest, based on predefined criteria.

4. A portion selection unit according to claim 3, wherein said predefined criteria is derived from one or more of: tasking priority, area coverage optimization, and a desired viewing angle.

5. A portion selection unit according to claim 1, wherein the order of the selected area portions is spatially sequential along an arbitrary scanning axis.

6. A portion selection unit according to claim 1, wherein the order of the selected area portions is spatially non-sequential.

7. A portion selection unit according to claim 1, wherein the order of the selected area portions follows a terrain section having a curved shape.

8. A portion selection unit according to claim 1, wherein the area of interest is of any shape.

9. A portion selection unit according to claim 1, wherein the area of interest has any orientation with respect to the aircraft attitude and flight trajectory.

10. A portion selection unit according to claim 1, wherein the area of interest is continuous.

11. A portion selection unit according to claim 1, wherein the area of interest is fragmented.

12. A portion selection unit according to claim 1, wherein said set of coordinates comprises the x and y coordinates of the respective area portion and the height coordinate z of the area portion.

13. A portion selection unit according to claim 1, wherein the height coordinate z of the area portion is obtained from a digital elevation map.

* * * * *